US005740157A

United States Patent [19]
Demiray et al.

[11] Patent Number: 5,740,157
[45] Date of Patent: Apr. 14, 1998

[54] DISTRIBUTED CONTROL METHODOLOGY AND MECHANISM FOR IMPLEMENTING AUTOMATIC PROTECTION SWITCHING

[75] Inventors: Sahabettin C. Demiray; Dale L. Krisher, both of Raleigh; Raymond E. Tyrrell, Wake Forest, all of N.C.

[73] Assignee: Alcatel Network Systems, Inc., Richardson, Tex.

[21] Appl. No.: 887,156

[22] Filed: May 21, 1992

[51] Int. Cl.$^6$ ................................................ H04L 1/22
[52] U.S. Cl. ................................................ 370/219; 370/220
[58] Field of Search .......................... 370/16, 58.1, 58.2, 370/13, 74, 13.1, 216, 217, 218, 219, 220, 221; 371/8.1, 7, 8.2; 340/825.01; 375/38

[56] References Cited

U.S. PATENT DOCUMENTS

| | | | |
|---|---|---|---|
| 4,382,294 | 5/1983 | Beuscher et al. | 370/16 |
| 4,455,645 | 6/1984 | Mijioka et al. | 370/58.2 |
| 4,837,760 | 6/1989 | Reid et al. | 370/16 |
| 4,964,095 | 10/1990 | Tyrrell et al. | 370/16 |
| 5,003,531 | 3/1991 | Farinhalt et al. | 370/16 |
| 5,091,902 | 2/1992 | Chopping et al. | 370/16.1 |
| 5,150,355 | 9/1992 | Dyer | 370/16 |
| 5,153,874 | 10/1992 | Kohno | 370/16 |
| 5,163,041 | 11/1992 | Monyama | 370/16 |
| 5,189,662 | 2/1993 | Kleine-Altekamp | 370/16 |
| 5,212,578 | 5/1993 | Grimes et al. | 370/16 |

FOREIGN PATENT DOCUMENTS

| | | |
|---|---|---|
| 0359352 | 3/1990 | European Pat. Off. . |
| 0381011 | 8/1990 | European Pat. Off. . |

OTHER PUBLICATIONS

"Synchronous Transmission Systems and Cross Connects for Broadband Networks", H. Ahmed et al, *Electrical Communication*, vol. 64, No. 2/3, 1990, Romford (GB), pp. 194–204.

*Primary Examiner*—Douglas W. Olms
*Assistant Examiner*—Ajit Patel
*Attorney, Agent, or Firm*—Ware, Fressola Van Der Sluys & Adolphson LLP

[57] ABSTRACT

Redundant facility payload signals (12, 14) received by redundant interface modules (16, 18) are redundantly provided (28, 30; 32, 34) to redundant downstream modules (24, 26) in an equipment (10). A non-symmetrical facility protection algorithm is resident in the B interface module (18). Symmetrical equipment protection algorithms are independently resident and operative in each module of pairs of identical A and B modules at each stage of the data stream. Module or data failures result in switchover only of the disabled data path or module so that the ability to transport payload is maintained and other modules or data paths are unaffected. Facility switchover is effected by detecting a working line failure and transmitting commands to switch the protection line to the A path modules. Equipment switchover is effected by checking for a working or protection module failure independently in each path and independently communicating independent switchover decisions to the other side and downstream. The methodology and mechanism are disclosed in a SONET element embodiment, although the invention is applicable in other contexts.

20 Claims, 22 Drawing Sheets

FACILITY SELECTION SCENARIO

PAYLOAD PATH
EQUIPMENT FAILURE

DISTRIBUTED CONTROL METHODOLOGY AND MECHANISM FOR IMPLEMENTING AUTOMATIC PROTECTION SWITCHING

CROSS REFERENCE TO RELATED APPLICATIONS

This disclosure discloses subject matter which is disclosed and claimed in co-pending applications U.S. Ser. Nos. 07/887,348, 07/886,723, 07/886,755, 07/886,724, and 07/886,783 filed on the same day as this application and owned by common assignee and which are hereby incorporated by reference.

TECHNICAL FIELD

This invention relates to a class of equipments known as "protected" equipment. There are many examples of protected equipment in systems, particularly electronic systems, and more particularly communications systems. The best mode embodiment of the present invention shown herein is for a SONET (Synchronous Optical NETwork) equipment; however, both the methodology and independently the mechanism are valid for and may be realized in other types of protected equipment.

BACKGROUND OF THE INVENTION

There exist many different types of equipment in a class called "protected" equipment. This class of equipment attempts to achieve an increase in reliability and availability of its features to its customers by structuring its implementation. This structure is realized as redundant sets of modules which are subparts of the equipment and which implement functions of the equipment. This equipment is structured and controlled such that there are redundant modules for each feature or group of features of importance for the equipment. In this structure there are at least two modules which can implement each important function. These modules are normally referred to as redundant modules or redundant module sets. Protected equipment solutions are constructed of one or more sets of these redundant modules. The premise for this structure is that if the currently selected one of these sets fails, the other unselected identical set can be quickly substituted for the failed set and the equipment can resume providing service to its customer(s).

A methodology and mechanism is required to control and communicate information regarding the control of the function which decides which of the redundant sets is the selected or active set. When this function is structured to operate without intervention of a separate equipment or personnel entity, it is commonly referred to in the art as "automatic protection switching" (APS). When used in reference to communication facility protection, it has as a subset that which is commonly called "equipment protection switching" (EPS) used in reference to the protection of the equipment modules themselves. These switching decisions could be made by a central controller; however, a mechanism to communicate with a central controller and the queuing associated with central controller multi-tasking solutions can add delay in the reconfiguration of the equipment to restore customer service which is lost when the active module of a redundant module set fails. Also, if the system controller fails or is removed, the possibility to perform the reconfiguration process is lost. Therefore, it is desirable to realize the automatic protection switching control function as a redundant distributed solution, so that this process as well as the customer services might be protected from single failures.

Automatic protection systems for network elements in the past have comprised, for example, redundant facility equipment wherein a detected failure in one of the redundant sides will cause a switchover from one redundant side to the other. In such a switchover the entire line of protection equipment on one side is substituted for the other, even if a failure occurred in only one place in the working channel. This approach is somewhat inflexible, in that it fails to maximize the available equipment.

Moreover, the switching decision would typically be made by the system controller but all the information relevant to the switchover decision then had to be sent to the system controller. Since the system controller services all the information in the system, it takes a long time to accomplish the switchover. It also requires that all the elements on the data path need to be switched during a switchover.

Thus, a better mechanism would be desired to control and communicate the information in a SONET automatic protection switching realization.

Moreover, it would be desirable to capitalize on the information so communicated to an extent that would fully provide a redundant switchover architecture.

DISCLOSURE OF INVENTION

This disclosure shows a structure and methodology which can be used to provide automatic protection switching between multiple redundant modules in this class of equipment (called "protected" equipment). This methodology realizes both a distributed multiprocessing "automatic protection switching" and "equipment protection switching" solution which is an alternative and improvement to the existing art of centralized protection switching methodologies and to other distributed processing automatic protection switching methodologies. This disclosure also shows a mechanism which implements the intermodule communication necessary to support this distributed automatic protection switching methodology.

This disclosure also shows an embodiment of this methodology and mechanism in a SONET electronic communications equipment. The descriptions and examples from this point on will be specific to a SONET communications equipment. However, both the methodology and independently the mechanism are valid for, and may be embodied in, other types of protected equipment.

Equipment of the type used in this disclosure example is commonly referred to as a network element, representing its use as an element of the telecommunications network. Network elements are commonly realized with redundant sets of multiple modules. The multiple redundant module sets used in this disclosure include the following modules: high-speed interface modules (a term commonly used for SONET interfaces), cross-connect modules and drop modules (a term commonly used for lower speed or tributary modules). The methodology and mechanism described in this disclosure is independent of the specific equipment, equipment makeup and terminology used to describe the example equipment described in this disclosure.

An object of the present invention is to provide a means and method which can be used to provide automatic protection switching between multiple redundant modules in a class of equipment called "protected" equipment.

Another object is to provide an automatic protection architecture.

Still another object of the present invention is to provide a mechanism to communicate the information for the SONET APS function.

According to the present invention, an automatic protection switching algorithm for a redundant pair of transmit modules is realized and operational on the protection, backup or "B" module. This algorithm continuously monitors the status of the signal information on both the A (working) and B (protection) modules and makes the decision as to whether the A or B module shall be selected to carry the active copy of the information traffic. It is not necessary, according to the present invention, for the automatic protection switching algorithm to communicate with a system-level control function or with any of the other distributed automatic protection algorithms resident in other sets of redundant modules to make this decision.

In still further accord with the present invention, for equipment protection, a processor failure algorithm is resident on both redundant sides for each redundant module pair. In other words, for example, for an A and B high-speed interface redundant pair, the APS algorithm is resident on both the A and B high-speed modules for communicating the status of each to each other independently of all the other modules on the A and B sides. By having the A and B sides cross-connected so that the outputs of upstream modules are provided redundantly in a cross-connected fashion to both downstream redundant modules, an indication by any module on either side that the other is faulty will cause only that module to be taken out of the system. This is distinguished from the prior art, where a detected failure would cause the whole A or B side to kick in or out.

According still further to the present invention, the APS functions are handled asymmetrically by placing the algorithm for checking statuses from both the A and B sides on the B side (protection side). Thus, the statuses on loss of signal, out-of-frame, loss of pointer and excessive bit error rate are checked, according to the present invention, on the protection (B) side, while a more symmetrical approach is taken for equipment failures, wherein each particular kind of module checks, with the same algorithm as its like module, a module failure within itself and communicates its status to the other like module.

According further to the present invention, an example network element has redundant high speed interfaces, cross-connects and drop modules wherein each upstream module on each redundant side provides a signal to a downstream module on one redundant side and also a redundant signal to a downstream module on the other redundant side in both the transmit and receive directions.

Thus, the present invention employs a "distributed" concept in which an upstream failure will result in the disablement of the upstream module in which the problem is detected, a switchover to a backup module at the same upstream level wherein the output of that upstream substitute module is provided to both downstream modules on each redundant side so that the working downstream module may continue to operate instead of having the entire backup redundant side substituted for the working side. In this way, the substituted upstream module and the original working downstream module will operate together until such time as either the original upstream module is healed or the downstream module is detected bad. In the former event, the original working upstream module can go back into the prior mode and take over the upstream function. In the latter case, the backup downstream module will be substituted for the primary working downstream module. In this way, the inflexibility of the prior art whereby an entire redundant side would be disabled if a problem were detected in one of its modules is avoided and a more flexible approach is taken whereby resources may be maximized. Although we have given an example of a disablement of an upstream disablement causing a switchover it should be realized that the concept applies equally well to downstream disablements. In other words, if for example a disablement is found in an intermediate module that module may be substituted for by a redundant intermediate module but the other working modules may stay the same.

In further accord with the present invention, the switchover decisions can be made on the redundant module sets detecting the failures and are communicated to the elements on the data path. Controllers on the working and protection high speed interfaces communicate for the switchover decisions.

In still further accord with the present invention, all elements on the data path receive payload data from both the working and protection high speed SONET interfaces. The decision is made on the first element that receives the payload data.

According further to the present invention, the mechanism also takes into account a self-diagnosed printed board assembly failure.

These and other objects, features and advantages of the present invention will become more apparent in light of the detailed description of a best mode embodiment thereof, as illustrated in the accompanying drawing.

BEST MODE FOR CARRYING OUT THE INVENTION

This invention relates to a class of equipment known as "protected" equipment. There are many examples of protected equipment in systems, particularly electronic systems, and more particularly communications systems. The best mode embodiment of the present invention shown herein is for a SONET (Synchronous Optical NETwork) equipment; however, both the methodology and independently the mechanism are valid for, and may be realized in, other types of protected equipment.

Figure 1:
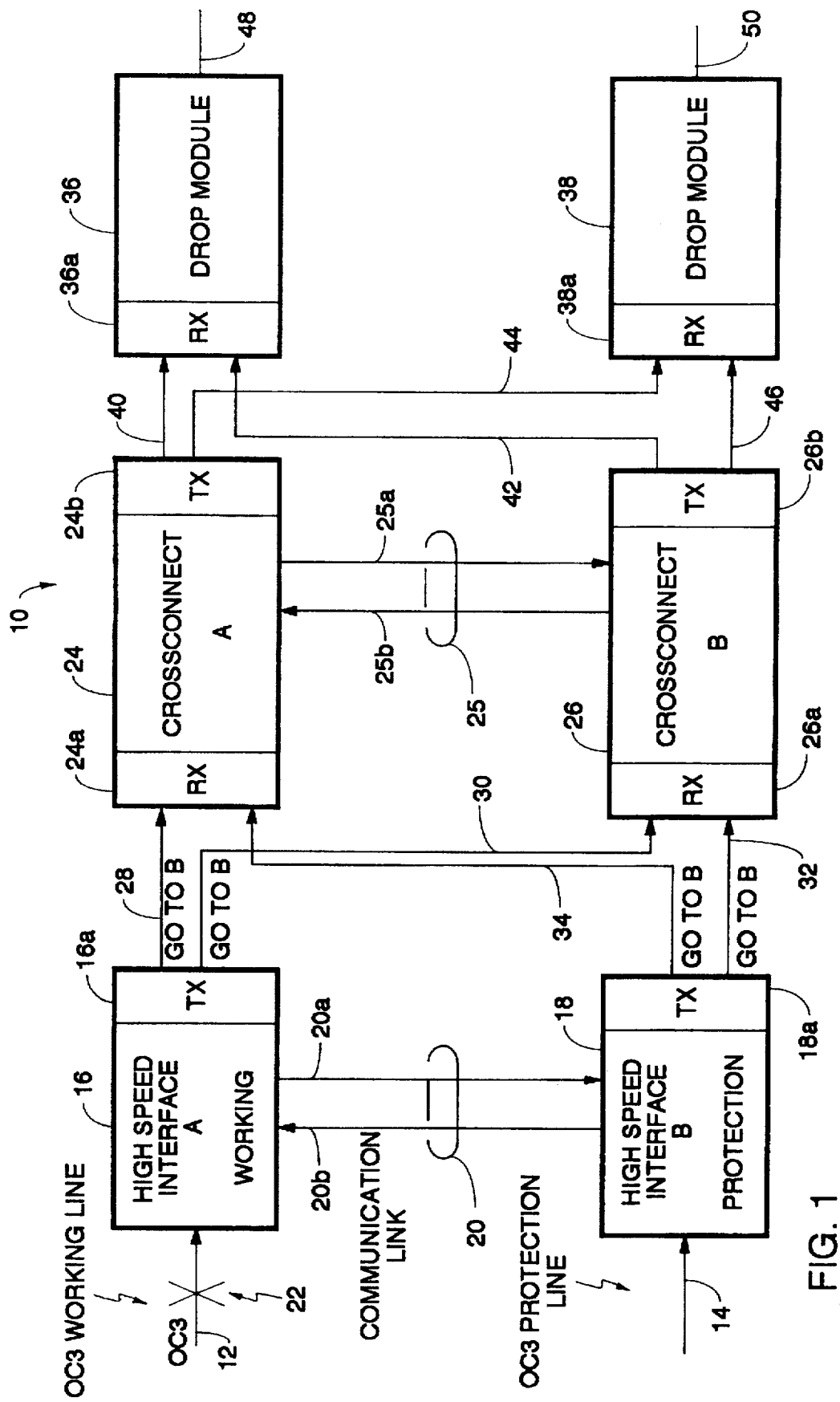
FIG. 1 shows a distributed switching example implemented for SONET facility and equipment switchover, according to the present invention.

FIG. 1 shows a distributed APS switching implementation 10 for SONET facility and equipment switchover, according to the present invention. A SONET facility, such as a central office, provides a SONET signal such as an OC-3 signal on a line 12 and a OC-3 protection signal on a line 14 which is a duplicate of the signal on the line 12 and serves as a backup. A SONET network element ("equipment" in industry parlance) such as shown in FIG. 1 can have a SONET interface A 16 for interfacing with the OC-3 working line 12 and will also have a SONET interface B, i.e., a protection interface 18 for interfacing with the protection line 14. A communication link 20 will be established between the A interface 16 and the B interface 18 for communicating status. For example, the high speed interface A 16 may detect a problem in the OC-3 line 12 as indicated by an "X" 22 and indicate to the high speed interface B 18 over the communication link 20 that there is a problem.

The module selection commands will be communicated to a cross connect A 24 by a K1* byte inserted in an internal SONET-like albeit parallel signal by the high speed interface A 16 and communicated over a parallel data path 28 existing between the high speed interface A 16 and the cross connect A 24. The K1* byte is an internal APS byte transported in the same byte position as the SONET K1* byte. A data path will also be provided on a line 30 for communicating K1* from the high speed interface A 16 to the cross connect B 26 at all times. Thus, the K1* byte indicating under normal conditions the selected active high-speed module request with the OC-3 working line 12 will also be communicated to the cross connect B 26 by the high speed interface A 16 over the line 30.

Similarly, a parallel data line 32 is provided between the high speed interface B 18 and the cross connect 26 and another data line 34 is provided between the high speed interface B 18 and the cross connect A 24.

A decision to switch over to one or the other high-speed modules is communicated over these lines in the K1* byte, as described below. A K2* byte, by way of acknowledgement, is provided in the opposite direction from the cross-connects to the high-speed interfaces to indicate compliance or lack thereof (not shown).

By having the cross connects 24, 26 responsive at all times to incoming data from both the working line 12 and the protection line 14, any decision to switch over to the other high-speed interface may be effected in an almost instantaneous manner without having to communicate back and forth to and from a system level control function and without having to cause a signal path to be established where none existed before. Moreover, by providing the upstream module selection in the K1* byte itself to the cross connects, the need for additional controller functionality to make the decision and effect the selection function is obviated.

Further, a pair of redundant downstream modules 36, 38 such as drop modules, are also distributed with respect to the cross connects 24, 26. In other words, drop module 36 is responsive at all times to the outputs of cross connect A 24 and cross connect B 26 as provided on signal lines 40, 42, respectively. Similarly, drop module 38 is responsive to the output of cross connect A 24 on a line 44 while at the same time being responsive to the output of cross connect B 26 on a line 46. The signal paths going in the drop direction, as shown in FIG. 1 are, of course, equally applicable in the opposite, add direction (not shown).

The architecture shown in FIG. 1 permits a distributed switching of inoperative hardware wherein, for example, if the A cross-connect 24 is detected to be inoperative, the B cross-connect will be used to respond to the signal on the line 30 as a continuing upstream working channel with the signal on the line 32 continuing its role as a backup channel. This is distinguished from the prior art of automatic protection switching wherein if a component such as the cross-connect A were detected bad it would cause the entire line of modules 16, 24, 36 to be taken out of service and the line of equipment 18, 26, 38 substituted therefor as backups to form an entire new line. This is a rather inflexible approach that does not maximize the available equipment. Our approach allows a more flexible and powerful sharing of components which increases the automatic protection capabilities of the system.

In the present disclosure, reference is made throughout to an STS-1 interface which is a proprietary interface used within assignee's network element equipment as the mechanism used to implement intermodule transport of the SONET payload. Since the bandwidth available from intermodule links is greater than that required by just the SONET payload itself, the STS-1 is also used as the mechanism to implement several system features. These features include STS-1** internal link status monitoring, equipment automatic protection switching (APS), and SONET facility automatic protection switching.

A. STS-1** Data Format

The format and information content of STS-1 is in general the same as the SONET's STS-1 as defined in ANSI T1.105-1990, incorporated herein by reference, with the exceptions that, depending on the interface, the overhead bytes may carry information identical to that on the corresponding STS-1 link, internally generated and/or terminated signals, or overhead bytes positions in which information is undefined or unused. Each STS-1 payload link is accompanied by an STS-1 8 kHz sync signal to identify the location of the STS-1 frame. Also, no part of the STS-1** is scrambled.

The generic position and description of bytes in the STS-1 are defined below for all STS-1 links, including optical and electrical interfaces, the Drop Modules and both STS and VT cross connects.

B. STS-1** Link Structure

The STS-1 interface is implemented as an 8 bit wide, STS-1 byte oriented, parallel interface. The byte boundaries of the STS-1 interface are defined such that SONET framing bytes, overhead bytes and payload bytes are transferred in a single clock cycle. The clock rate of the STS-1** is 6.48 MHz (51.840 MHz divided by 8 bits per byte). The location of the A1 framing byte is identified by a coincident one bit 8 KHz sync signal.

In the receive direction (the direction from the High Speed Interfaces and Drop interface Modules toward the cross connect) each STS-1 will consist of an 8 bit wide STS-1 byte oriented, parallel interface and a 1 bit STS-1 sync signal. The location in time of the A1 byte and STS-1 sync shall be placed on the bus by these interface modules at a time three 6.48 MHz clock cycles after the interfaces receive the 2 kHz network element frame sync from the clock module. The position of the A1 byte for modules receiving the receive STS-1 is identified by the 8 kHz STS-1 frame sync accompanying the STS-1 as a separate signal. This sync signal makes it optional for each receiving interface to implement a framing circuit; however to maintain compatibility with some existing ASICs (not shown), it remains a requirement in this case for each STS-1 transmitter to implement an A1, A2 framing generator. Note that the location in time of the STS-1 and its sync signal is separate from and positioned by the network element 2 kHz sync signal received from a Synchronization Subsystem (not shown) to all STS-1** generating payload carrying modules.

In the transmit direction (the direction from the cross connect toward the High Speed Interfaces and DROP interface Modules) the STS-1 definition and function is the same as the receive direction. The STS-1 will consist of an 8 bit wide STS-1 byte oriented parallel interface and a 1 bit STS-1 sync signal. The position of the A1 byte is identified by an 8 kHz STS-1 frame sync accompanying the STS-1** as a separate signal.

C. STS-1** Error Monitoring

Each STS-1 interface contains a valid BIP-8 parity code in the B2 position of the STS-1 frame. This B2 is referred to as B2*. The B2* byte is an odd parity BIP-8 (as opposed to the SONET B2 which is even parity), calculated over all bytes of the STS-1 line overhead and STS payload and provides in service, full time monitoring of the STS-1 link. Each STS-1** link uses B2* to identify a degradation of signal condition on any of the 8 parallel bits. By monitoring B2* the ability of each STS-1 to carry error free payload is continuously evaluated. This technique provides STS-1 loss of signal and loss of frame detection mechanism, detects stuck at 0 and stuck at 1 faults on single or multiple lines, and identifies random or deterministic bit errors in the line overhead and STS payload. This information is available to the facility and equipment APS functions and to the maintenance functions. The B2* function provides the primary condition to APS to switch payload to a duplex equipment set for STS-1** interface failures and unprovisioned module removals.

B2* is detected and evaluated for all STS-1 receivers. A detected error in any of the 8 BIP error positions in an STS-1 frame is counted as a single STS-1* link error. The occurrence of a single error is latched in a single bit STS-1 error history register. This register is accessible to the local controller (not shown), can be read by the controller and reset by the controller. The detection of an STS-1 link error may be accompanied by a controller interrupt.

STS-1** link errors also provide an input to an STS-1* status mechanism. This function provides an indication of the long term status of each STS-1 link. The function is implemented by an up/down non-rollover 5 bit counter (divide by 32). The counter counts down by 1 to zero (but not past zero) for each STS-1 frame received without a STS-1 link error. The counter increments by 4 to 32 (but not past 32) for each STS-1 frame received with a STS-1 link error. When the value of the counter exceeds 16, the STS-1 link is considered failed. This status is the B2* input to the equipment automatic protection switching function and a change of status of the B2* state is sent to the local controller as an interrupt event. This feature is further disclosed and claimed in the above-cited co-owned, copending application U.S. Serial No. (Atty. Docket No. 907-121).

D. STS-1** Selection Mechanism

All payload carrying module interfaces consist of a redundant set of A and B STS-1 transmit and receive datalinks. The selection of the active link from these redundant sets of A and B STS-1 inputs is done at each STS-1** interface receiver. The selection is based on two modes of selection mechanisms:

1) Manual Mode (Local Controller Selection Mechanism)
2) APS Selection Mode (Directed Selection Mechanism)

These selection mechanisms are discussed in detail below. They are evaluated for purpose, functionality and priority. Each of the assignee's forthcoming ADM 150 product modules receiving an STS-1 interface shall have the STS-1 receiver selection function capable of terminating both of the selection mechanism modes listed above. Modules generating the STS-1 interface may or may not implement a full featured APS generation mechanism; for example, the facility APS generation algorithm would not be implemented in facility interface modules which did not offer redundant facility protection. These modules would only generate the equipment APS portion of the switching algorithm. The STS-1 selection state table is summarized in Table I below for both the Manual and APS modes.

TABLE I

STS-1** APS Selection Algorithm

| Mode | Manual Select Request | STS-1** A B2* Status | STS-1** A Select Request | STS-1** B B2* Status | STS-1** B Select Request | Selected |
|---|---|---|---|---|---|---|
| APS | X | OK | A | OK | A | A |
| APS | X | OK | B | OK | B | B |
| APS | X | OK | A | OK | B | No Change |
| APS | X | OK | B | OK | A | No Change |
| APS | X | OK | No Pref | OK | A | A |
| APS | X | OK | No Pref | OK | B | B |
| APS | X | OK | A | OK | No Pref | A |
| APS | X | OK | B | OK | No Pref | B |
| APS | X | OK | No Pref | OK | No Pref | No Change |
| APS | X | FAIL | X | OK | A | A |
| APS | X | FAIL | X | OK | B | B |
| APS | X | FAIL | X | OK | No Pref | No Change |
| APS | X | OK | A | FAIL | X | A |
| APS | X | OK | B | FAIL | X | B |
| APS | X | OK | No Pref | FAIL | X | No Change |
| APS | X | FAIL | X | FAIL | X | No Change |
| Manual Forced | A | X | X | X | X | A |
| Manual Forced | B | X | X | X | X | B |

Note:
The two K1* states interpreted as "Link Failures" (000 and 111) shall be interpreted by the STS-1** selection algorithm as if a "No Preference" state had been received.

D.1. Manual Mode (Local Controller Selection Mechanism)

The manual mode provides a method for the local controller or the module performing an STS-1 selection function to override all other selection mechanisms and dictate whether the STS-1 receiver is selecting the A or B STS-1 input. This is the highest priority selection mechanism and all other selection mechanisms are ignored when this feature is invoked. The primary use of this feature is to facilitate a module being removed from service. All modules receiving an STS-1 from the module selected for removal can use this mechanism to route their active receive payload paths through the alternate duplex equipment set. When all active payload paths are rerouted around the selected module, removal of the module can be performed without generating the set of alarms that accompany an unprovisioned module removal. Consistent with its intended use, when this feature is used to override the equipment and/or facility APS mechanisms, a loss of active payload may result. Note that when the manual mode is invoked, all the facility and equipment APS algorithms are still operating and communicating valid STS-1 select requests and responses. The manual mode simply ignores the APS selection algorithm's selection request and substitutes the manual mode selection. This feature is important when exiting the manual mode and returning to the APS mode. Since the APS algorithms were never interrupted, the local controller will know the correct STS-1 selection state to return to.

D.2. APS Selection Mode (Directed Selection Mechanism)

The APS selection mechanism provides a method, according to the present invention, which allows the STS-1** receiver to act as the selection point for the APS function. Therefore a switch from the A STS-1 to the B STS-1 represents a switch from the primary path (usually designated #1, A or primary) to the secondary path (usually designated protection, B or secondary). All assignee's modules which implement a duplex equipment and/or facility protection scheme use this mechanism. The APS selection mechanism is overridden by the manual controller selection mechanism. The STS-1** selection state table is summarized in Table I for both the Manual and APS modes.

As alluded to above, the APS selection mechanism communicates between the STS-1 generating module and the STS-1 receiving (selection) module using the K1* and K2* bytes of the STS-1 link. These bytes are located in the same position in the STS-1 line overhead as the K1 and K2 bytes which implement the facility APS function in the SONET facility but have unique definitions and handling. Each STS-1**'s K1* and K2* bytes are independently integrated for three frames (three consecutive identical values) before they are considered valid. An interrupt is sent to the local controller when the integrated value of K1* and/or K2* changes. The selection mechanism then uses the A/B STS-1** selection request in the K1* byte of the operating STS-1** interface(s) according to the selection state table of Table I.

K1* requests received from both A and B STS-1 inputs as well as the current STS-1 selection state are returned in the reverse direction in the K2* byte. This allows the STS-1 switch generation mechanism to know the current state of its duplex unit and the downstream STS-1 receiver.

The K1* byte is the command channel of the APS mechanism. It uses the three least significant bits (LSB) of the byte to signal APS selection requests. The requests are for Select A, Select B, and No Preference. No preference is used to signal that a local failure has been detected by the STS-1** generating module and that the receiver should honor the APS request from the duplex unit. Also each request can have two values, one being the inversion of the other (i.e. Select A code=001 or 110). This is to detect silent failures in the APS selection datapath. The K1* request bits are reflected in the K2* byte from the receiving end. By sending the inverted code for the current APS request, the new code will be seen in the return K2* byte verifying the datapath without affecting the current APS selection. Codes 000 and 111 will never be generated, and if received will signify an error condition and will be treated as a No Preference. Table II summarizes the definition and values of the transmitted and received K1* byte.

TABLE II

K1* (Command) Byte Definitions

Transmitted K1* Byte
7 6 5 4 3 2 1 0

| Reserved for Interconnection Verification | STS-1** Select Request |
|---|---|

| | | | |
|---|---|---|---|
| 0 | 0 | 0 | Never Generated |
| 0 | 0 | 1 | Select A |
| 0 | 1 | 0 | Select B |
| 0 | 1 | 1 | No Preference |
| 1 | 0 | 0 | No Preference |
| 1 | 0 | 1 | Select B |
| 1 | 1 | 0 | Select A |
| 1 | 1 | 1 | Never Generated |

TABLE II-continued

K1* (Command) Byte Definitions

Received K1* Byte
7 6 5 4 3 2 1 0

| Reserved for Interconnection Verification | STS-1** Select Request |
|---|---|

| | | | |
|---|---|---|---|
| 0 | 0 | 0 | Link Fail (No Pref) |
| 0 | 0 | 1 | Select A |
| 0 | 1 | 0 | Select B |
| 0 | 1 | 1 | No Preference |
| 1 | 0 | 0 | No Preference |
| 1 | 0 | 1 | Select B |
| 1 | 1 | 0 | Select A |
| 1 | 1 | 1 | Link Fail (No Pref) |

Note:
The two K1* states interpreted as "Link Failures" (000 and 111) shall be interpreted by the STS-1** selection algorithm as if a "No Preference" state had been received. Separately, the receipt of a link failed state shall be an input to the equipment status algorithms and can be used to alarm equipment failures and assist troubleshooting algorithms attempting to identify failed modules and failed internal interfaces.

The K2* byte is the reverse status channel of the APS mechanism. It returns the K1* select request bits sent by each module and its duplex module receiving unit mode (Manual Forced or APS). This allows the APS algorithm in each module to know the status of the downstream receiving unit and its duplex partner unit. The received K1* request bits are reflected in the K2* byte unless a B2* Link Failure is detected in that link, then a 111 code is returned to signal that a link failure has been detected. A 000 code will never be generated and if received indicates an error condition. Table III summarizes the definition and values of the transmitted and received K2* byte.

The information contained in each K2* byte is a complete set of the selection requests from both the A and B redundant modules, and also the state of the selection mechanism in the downstream module. This information can be evaluated by a verification algorithm which is a subset of the APS algorithm to establish that the selection decision produced by the APS algorithm has indeed been honored by all modules involved with that APS process. This verification algorithm can thus establish whether each of the communication links between the modules associated with that APS process is operating correctly. Also, it can establish that each redundant module is correctly transferring switching state requests from the communication link between the redundant modules to the downstream modules performing the selection function. By substituting the redundant values of the selection requests, the verification algorithm can also establish the status (operational or failed) of all the messaging links and message transfer functions. Because each of the switch request states has a redundant set of values, these tests can be performed continuously, without affecting customer traffic. Therefore, this invention provides the methodology and the mechanism to provide comprehensive, continuous, in-service self diagnostics of the APS function with no adverse effects on customer service.

TABLE III

K2* (Status) Byte Definitions

Transmitted K2* Byte

| | | | Selected STS-1** | | Duplex Select Request | | | Return Select Request | | | |
|---|---|---|---|---|---|---|---|---|---|---|---|
| Bit | 7 | 6 | 5 | 4 | 3 | 2 | 1 | 0 | | | |
| | | | | | | | | | | | |
| APS Mode | 0 | 0 | 0 | 0 | 0 | 0 | 0 | 0 | Never Generated | | |
| Select A | | | 0 | 0 | 1 | 0 | 0 | 1 | Select A | | |
| APS Mode | 0 | 1 | 0 | 1 | 0 | 0 | 1 | 0 | Select B | | |
| Select B | | | 0 | 1 | 1 | 0 | 1 | 1 | No Preference | | |
| Manual Mode | 1 | 0 | 1 | 0 | 0 | 1 | 0 | 0 | No Preference | | |
| A Forced | | | 1 | 0 | 1 | 1 | 0 | 1 | Select B | | |
| Manual Mode | 1 | 1 | 1 | 1 | 0 | 1 | 1 | 0 | Select A | | |
| B Forced | | | 1 | 1 | 1 | 1 | 1 | 1 | B2* Failure on Receive STS-1** Link | | |

Received K2* Byte

| | | | Selected STS-1** | | Duplex Select Request | | | Return Select Request | | | |
|---|---|---|---|---|---|---|---|---|---|---|---|
| Bit | 7 | 6 | 5 | 4 | 3 | 2 | 1 | 0 | | | |
| APS Mode | 0 | 0 | 0 | 0 | 0 | 0 | 0 | 0 | Link Failure | | |
| A Selected | | | 0 | 0 | 1 | 0 | 0 | 1 | Select A | | |
| APS Mode | 0 | 1 | 0 | 1 | 0 | 0 | 1 | 0 | Select B | | |
| B Selected | | | 0 | 1 | 1 | 0 | 1 | 1 | No Preference | | |
| Manual Mode | 1 | 0 | 1 | 0 | 0 | 1 | 0 | 0 | No Preference | | |
| A Forced | | | 1 | 0 | 1 | 1 | 0 | 1 | Select B | | |
| Manual Mode | 1 | 1 | 1 | 1 | 0 | 1 | 1 | 0 | Select A | | |
| B Forced | | | 1 | 1 | 1 | 1 | 1 | 1 | Link Failure or B2* Link Failure | | |

An important feature of the STS-1 interface is that the selected A/B STS-1 information that is transported in the reverse direction over the STS-1** link by the K2* byte can be used by the APS process to extend equipment protection over the STS-1** links.

D.3 STS-1 Selection Algorithm Description The following provides a description of the various STS-1 selection algorithm states found in Table I.

In normal operating circumstances the A/B STS-1** switch request bits in the K1* byte from the A and B STS-1** generating modules have the same value and the switch request shall be honored when the K1* verification algorithm described has been satisfied.

In the normal transient case (where the A/B STS-1** switch request bits in the K1* byte do not match in exactly the same frames, a normal condition during switchover) or when an equipment failure presents a conflicting switch request from the A and B STS-1 generators the A/B STS-1 switch selection mechanism maintains a "no change" state (if it was selecting STS-1 A it continues selecting STS-1 A, same for selecting STS-1 B) until this conflicting A/B STS-1 selection switch state is cleared.

When both STS-1** selection request generators are indicating the "no request" state, the selection mechanism maintains the "no change" state described above.

When a single STS-1 link failure is detected, the STS-1 selection algorithm will honor the A/B STS-1 request bits of the STS-1 link which is still operating without failure, even if the A/B STS-1** switch request bits are selecting the failed link (this should be a transient condition). This selection criteria can force the selection of a non-operative or even non-existent facility interface which may result in a loss of payload, however this is consistent with the facility APS scenarios.

When both STS-1** links have failed, the selection mechanism maintains the "no change" state described above.

When the Manual Mode selection mechanism commands the selection mechanism to select the A or B STS-1**, the selection mechanism shall comply, even if the selection request conflicts with the APS mode selection request being received in byte K1*.

D.4. STS-1** Selection Scenarios

The following provides specific examples of STS-1** events.

D.4.1 Manual Mode, Local Controller Selection Scenarios

Figure 2:
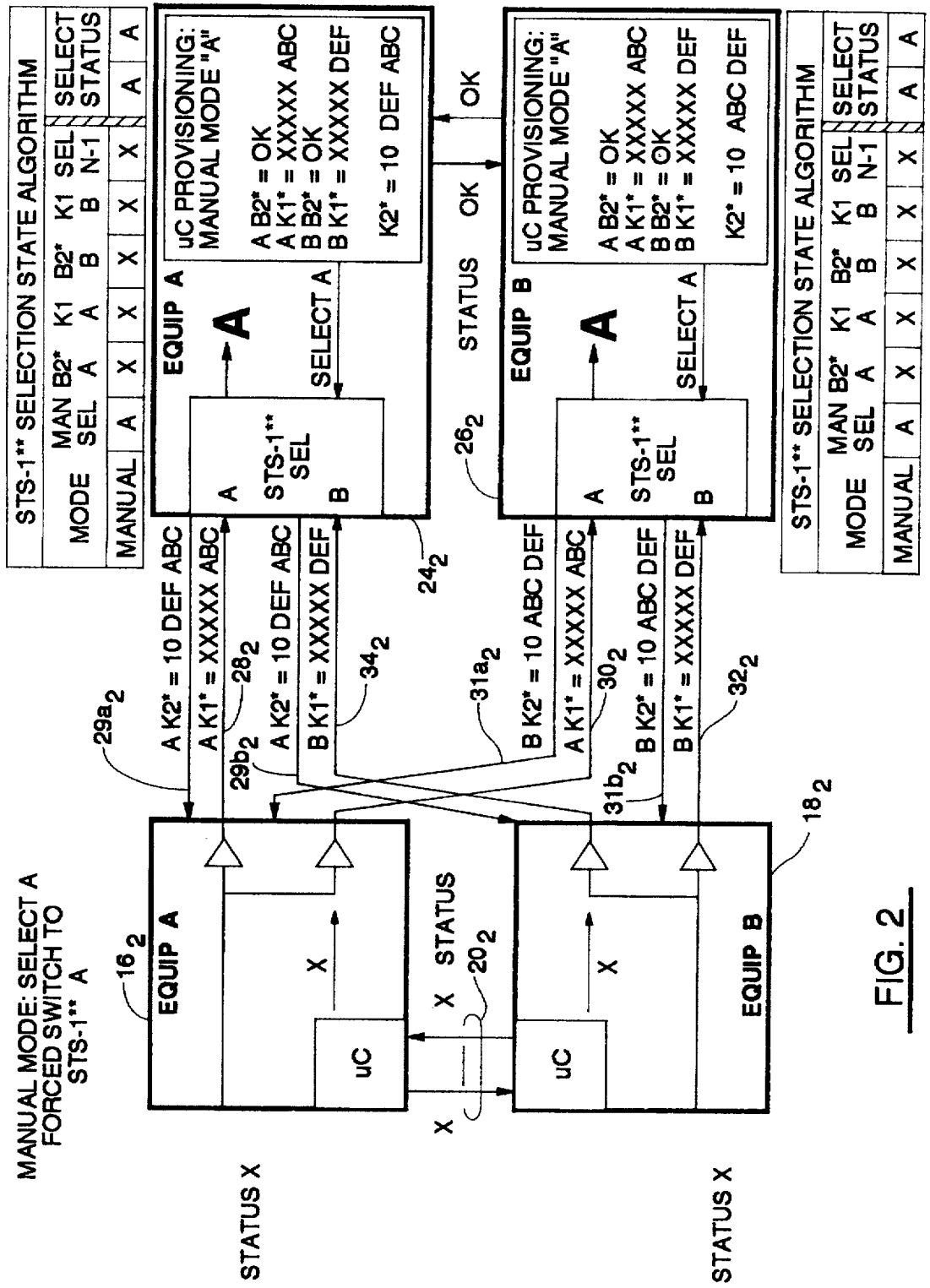
FIG. 2 shows the manual mode of operation wherein the A equipment is selected in a forced switch.
Figure 3:
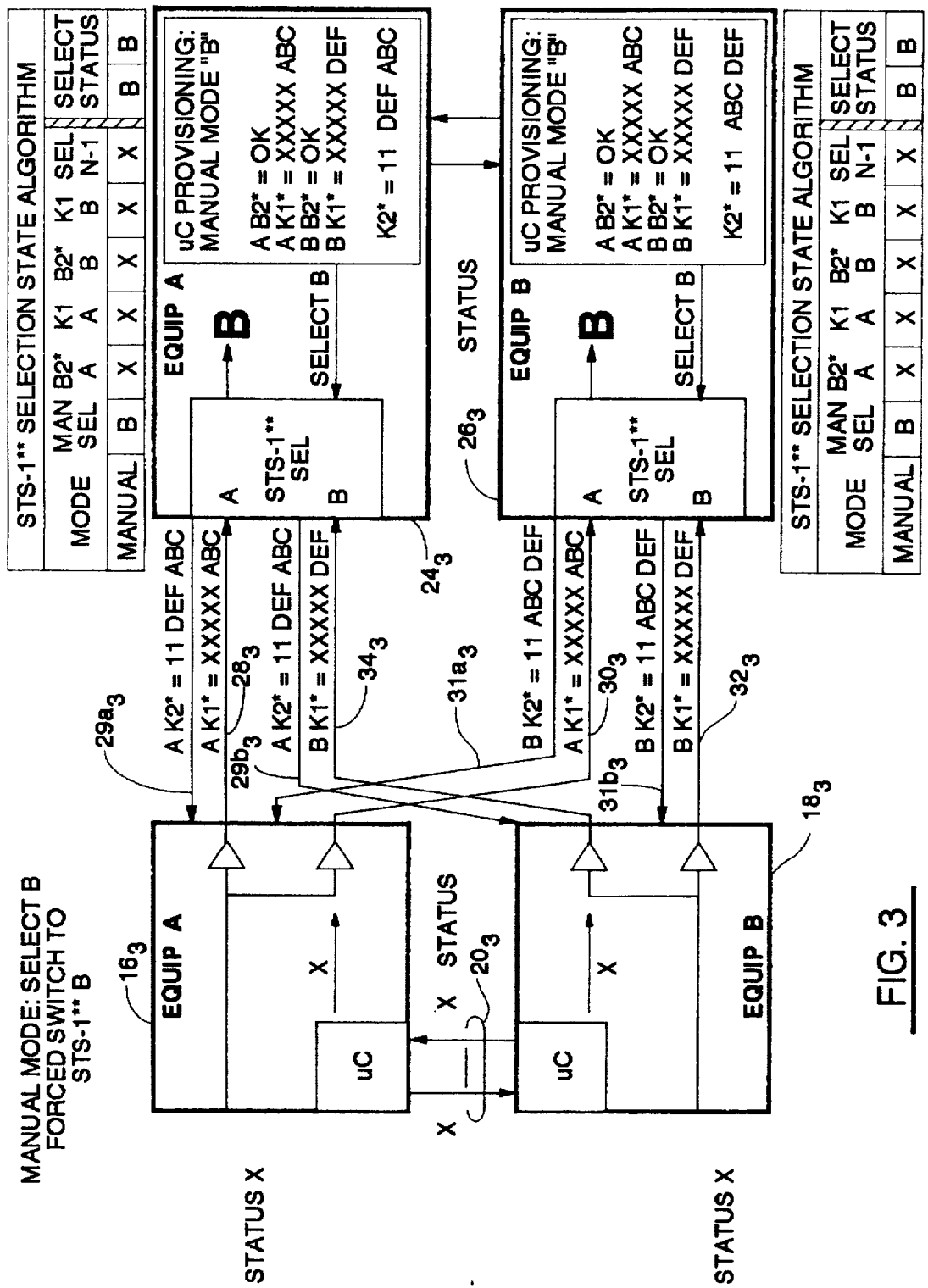
FIG. 3 shows manual mode with a forced switch to equipment B.

There are two states for the controller selection mechanism, the select STS-1 A state and the select STS-1 B state. Examples of these two states are shown in FIGS. 2 and 3, respectively. The following event descriptions describe these two Manual Mode, Select STS-1** A (FIG. 2)

1. Initial State: The initial state can be any of the STS-1** selection states.

2. A system level control function provisions the local controller to select STS-1** A: This would be a response to a craft/OS command or local test or maintenance routine.

3. The local controller provisions the STS-1 selection mechanism to select STS-1 A: This command is absolute and overrides all other input parameters to the selection mechanism.

4. STS-1 A State: The STS-1 selection mechanism is now in the select STS-1** A state and will remain until provisioned otherwise.

Manual Mode, Select STS-1** B (FIG. 3)

1. Initial State: The initial state can be any of the STS-1** selection states.

2. A system level controller provisions the local controller to select STS-1** B: This would be a response to a craft/OS command, local test or maintenance routine.

3. The local controller provisions the STS-1 selection mechanism to select STS-1 B: This command is absolute and overrides all other input parameters to the selection mechanism (K1* and B2* status).

4. STS-1 B State: The STS-1 selection mechanism is now in the select STS-1** B state and will remain until provisioned otherwise.

D.4.2. APS Mode, Directed Selection Scenarios

There are two types of APS Mode Selection algorithms, a facility APS selection algorithm and an equipment protection algorithm. Facility protection APS algorithms are executed in the facility interface modules of facilities with duplex facility protection (primarily SONET facilities). The distinguishing characteristic of facility protection algorithms is that they operate in facility interfaces where there is no processor or equipment failure. When an equipment failure is detected the equipment protection algorithm takes over the APS process. Equipment protection algorithms are implemented in all duplex equipment protected modules (including facility protected modules). The following sections provide examples of both types of APS mode protection.

D.4.3. APS Mode, Facility Selection Scenario

The facility selection scenario is designed to demonstrate how the STS-1 selection mechanism implements the function of the STS-1 A (working line) or STS-1B (protection line) selection. The APS mode of the STS-1 selection mechanism is used to implement the facility protection selection for any facility which has duplex facility protection (usually referred to as 1:1 or 1+1 facility protection). SONET interfaces are examples of facilities which are normally engineered with duplex facility protection, however, this mechanism will operate with all facility interfaces should they implement a duplex facility protection mode.

SONET interfaces are the only facility interfaces which are currently engineered to operate in the duplex facility protection mode, therefore this scenario is written for the OC-N interfaces. Note that, according to the invention, the OC-N facility APS is an unsymmetrical protection algorithm, i.e., facility failures on the working line are handled differently than facility failures on the protection line. Since the failure of the protection line when payload is being carried on the working line requires no action by the STS-1 selection mechanism there is no explicit STS-1 selection scenario for this event. Actions initiated by the failure of the protection span under these conditions are primarily alarm related.

The failure of the protection line when the working line has failed, a switchover to the protection line has been completed, the working line has cleared and is waited for manual restoration is a variation of the working line failure scenario and is covered as a subset of this scenario.

Figure 4:
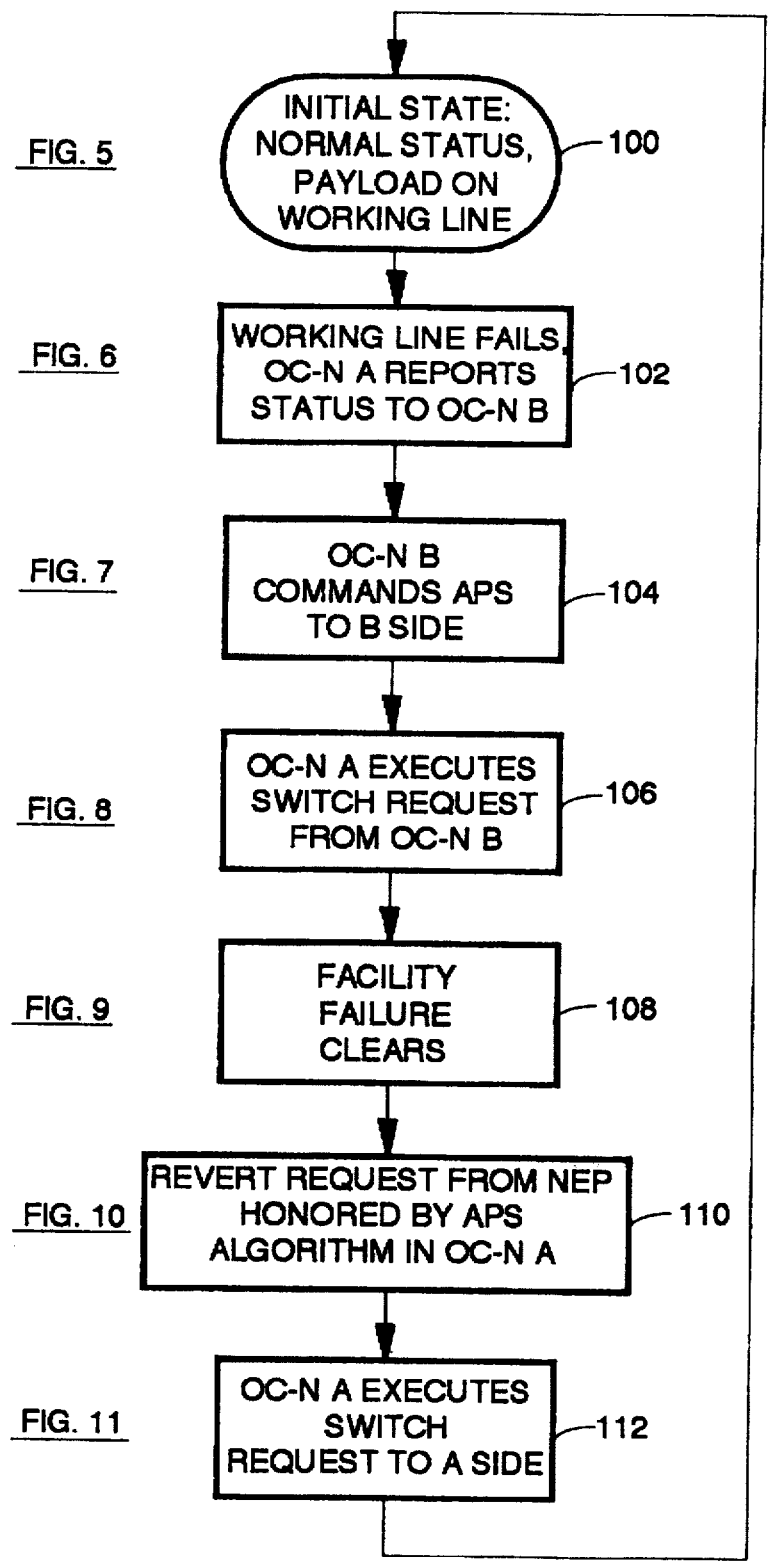
FIG. 4 is a flow chart showing a series of steps carried out, according to the present invention, according to a facility APS selection algorithm as further detailed in FIGS. 5–11.
Figure 5:
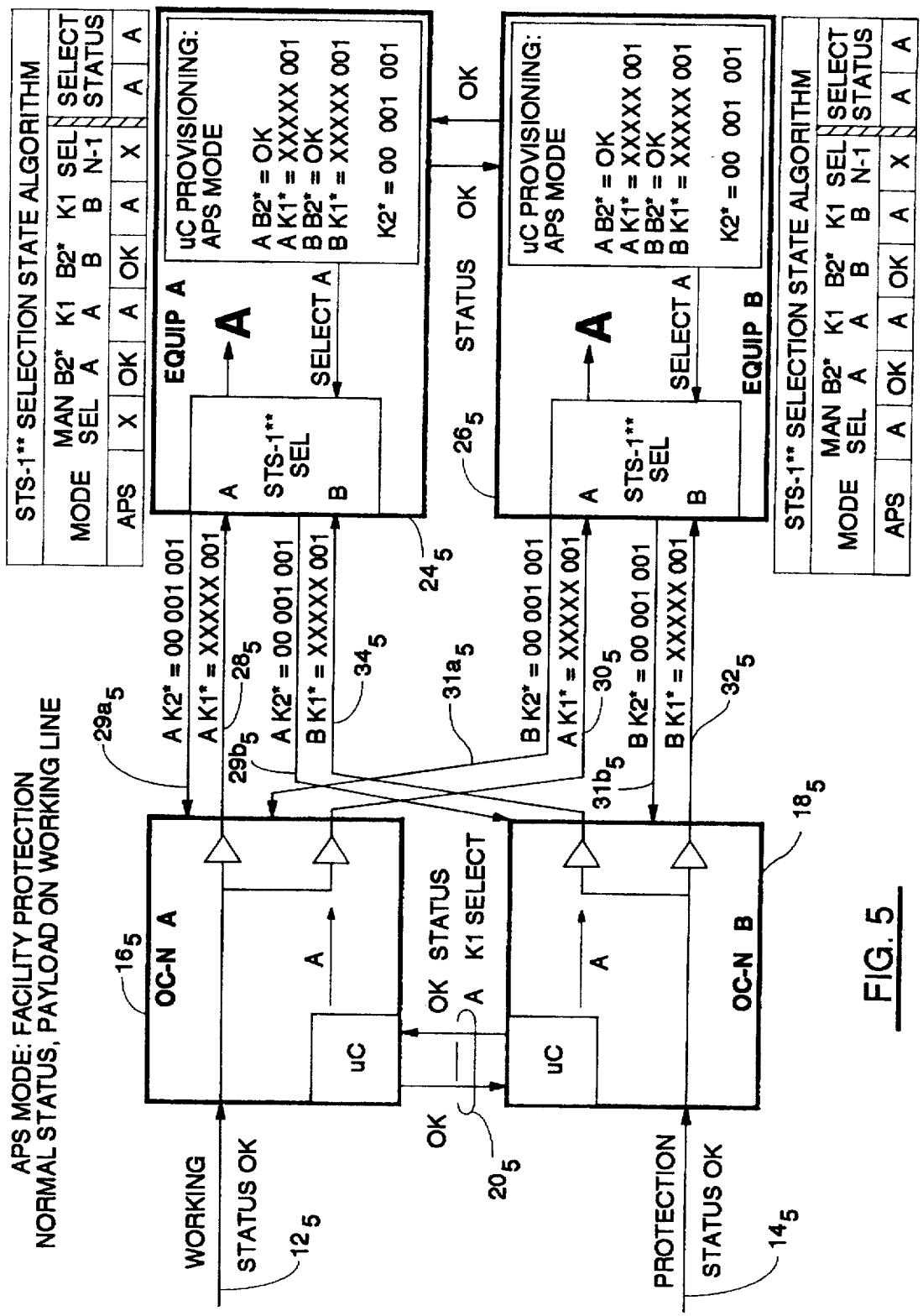

1. Initial State 100: (FIGS. 4 & 5) The system level control function instructs the local controllers for the corresponding duplex facility interfaces and the STS-1 selection mechanism to operate in the APS mode. Both working and protection lines are operational and both duplex facility interfaces (OC-N interfaces in this example) are working and provisioned to operate in the APS mode. In this state both STS-1 selection mechanisms implement the term of the selection state table shown in FIG. 5 and select STS-1** A (the working line). Note that payload received over the working line through OC-N interface A is selected by both cross connect A and B duplex equipment sets.

Figure 6:
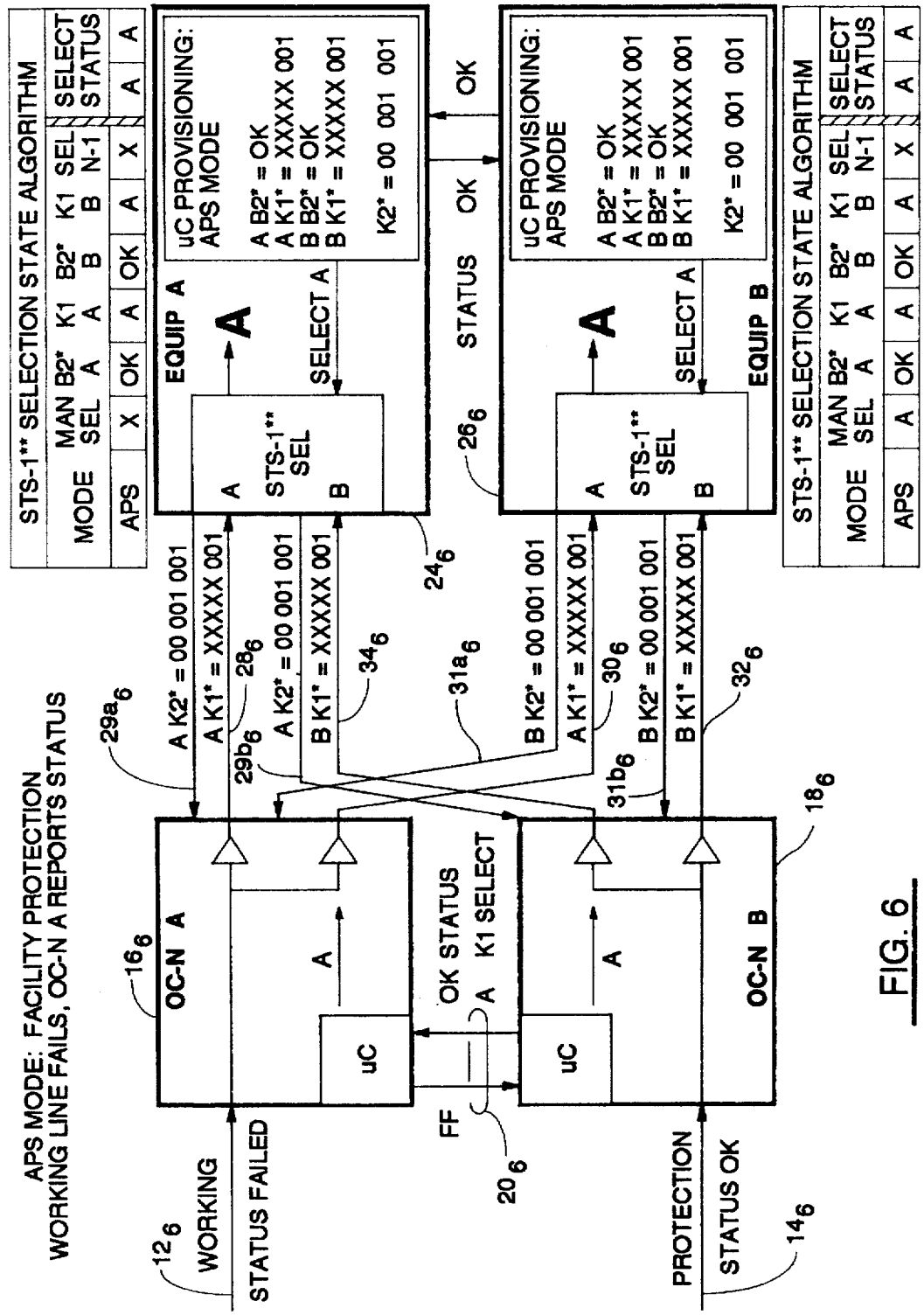

2. Working Facility Fails 102: (FIGS. 4 & 6) The local controller on the OC-N A interface detects the facility failure. The local controller in OC-N A reports the working line facility failure to the local controller in OC-N B. The controller in OC-N B inputs this parameter into the facility APS algorithm operating on OC-N B and decides whether or not to initiate a change in the module selection request. Note that OC-N A does not autonomously send K1* with a switch select request to the STS-1 B state. In this state both STS-1 selection mechanisms implement the term of the selection state table shown in FIG. 6 and select STS-1** A (the working line).

Figure 7:
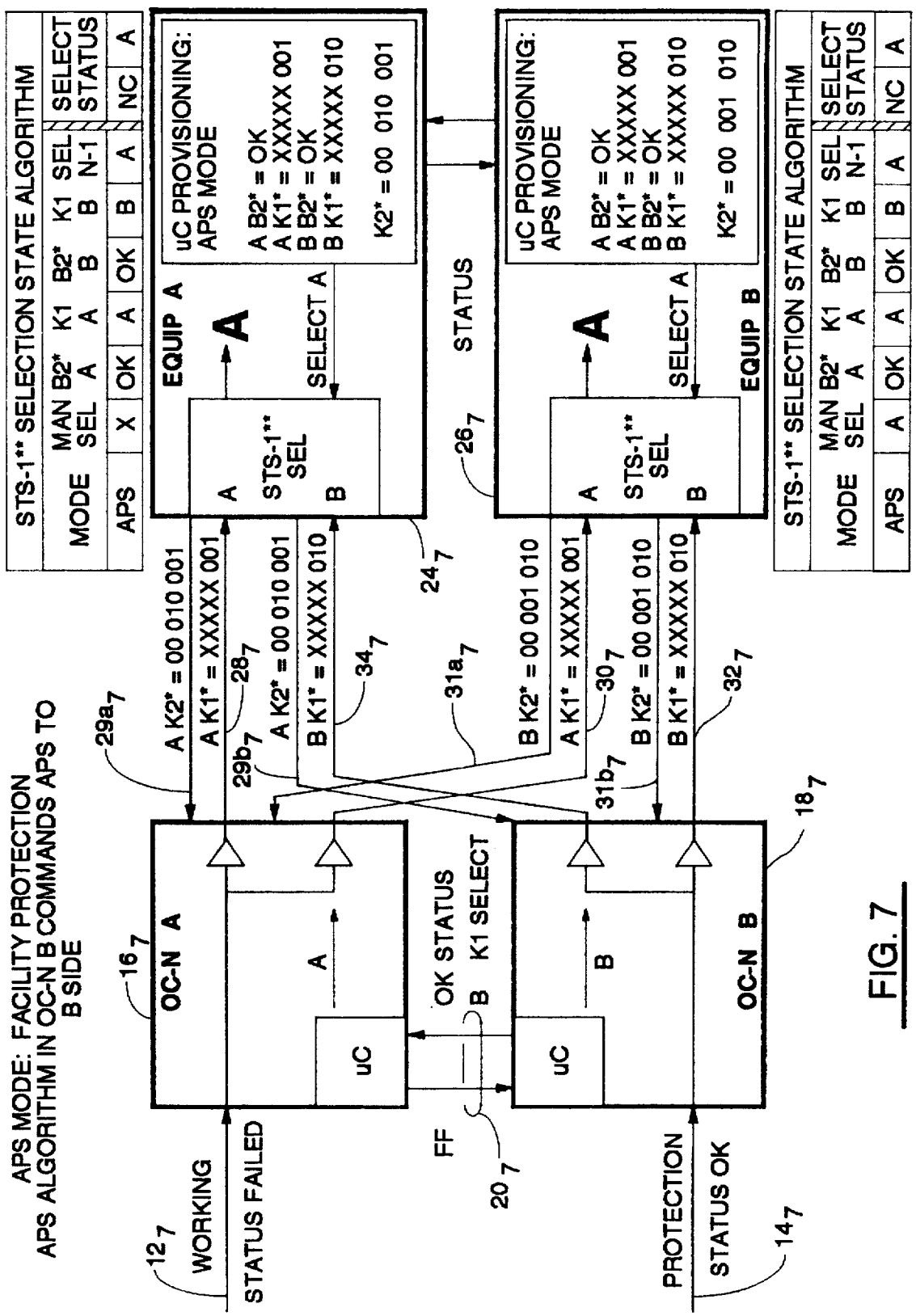

3. Facility APS Algorithm commands an APS to the Protection Line 104: (FIGS. 4 & 7) The controller on OC-N B provisions the K1* byte on both its STS-1 transmitters to indicate a request to switch to STS-1 B. It also sends a command to the OC-N A interface controller to request a switch to STS-1B. In this state both STS-1 selection mechanisms implement the term of the selection state table shown in FIG. 7, recognize conflicting selection requests and remain in their initial state (a no change action), this leaves the payload still operating off of STS-1** A (the working line).

Figure 8:
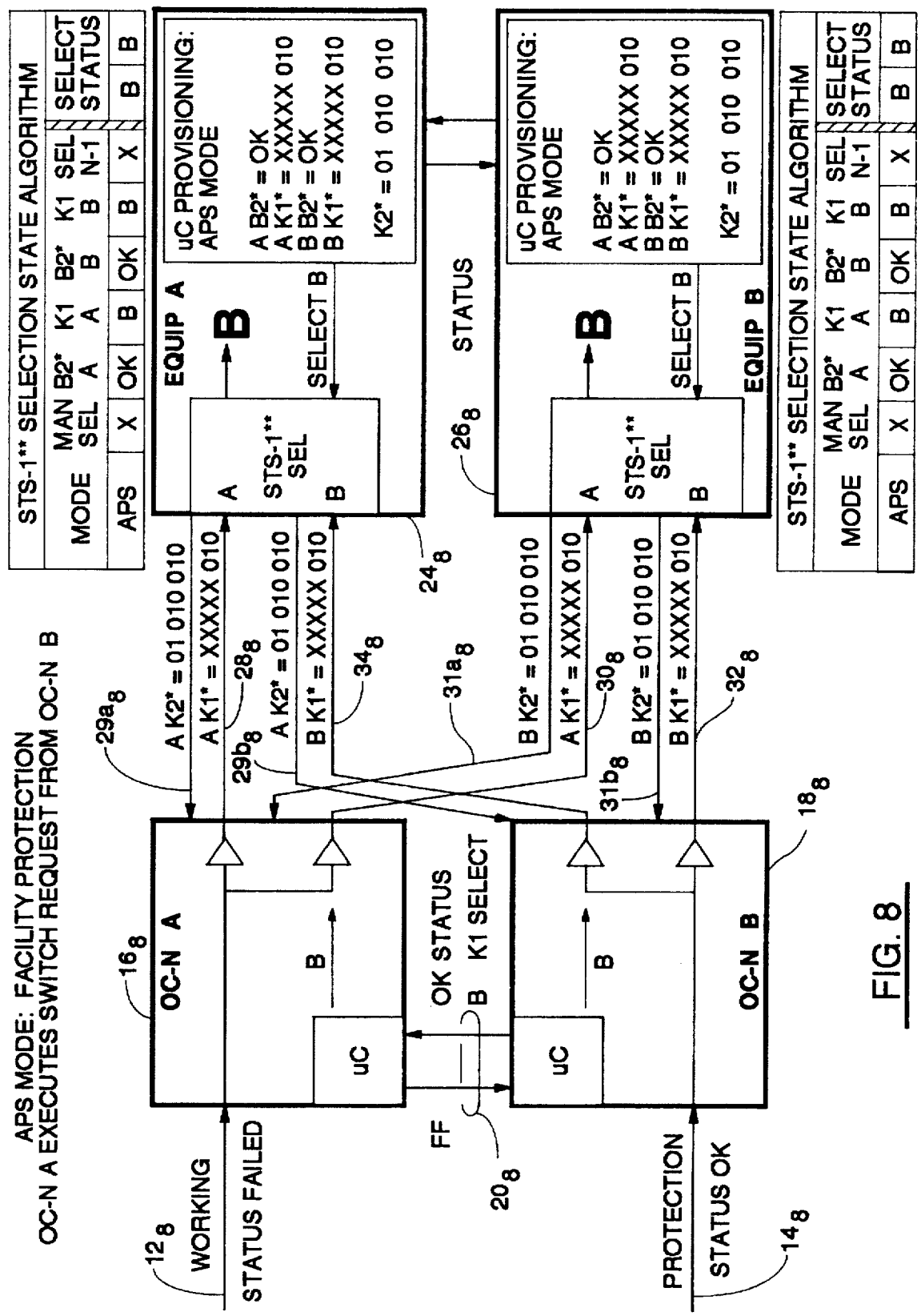

4. OC-N A Executes the Switch Request from OC-N B 106: (FIGS. 4 & 8) The controller on OC-N A receives the command to send a request to switch to STS-1** B (the protection line). The controller provisions the K1* byte on both its STS-1 transmitters to indicate a request to switch to STS-1 B. In this state both STS-1 selection mechanisms implement the term of the selection state table shown in FIG. 8 and select STS-1 B (the protection line). This is the long term state of a facility interface with a working line failure until operation of the working line is restored and a revert to working line is received from the controller.

Figure 9:
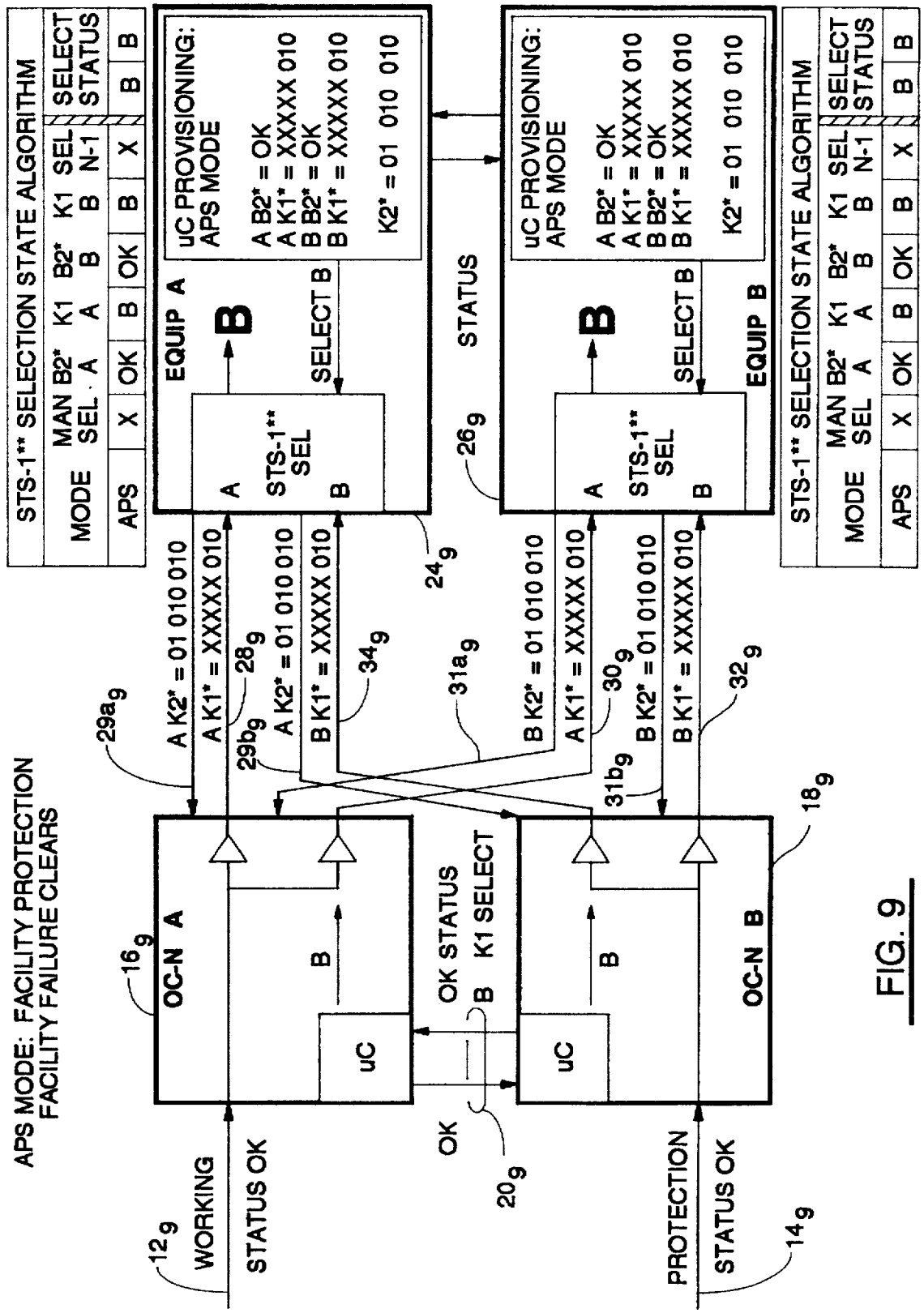

5. Facility Failure Clears 108: (FIGS. 4 & 9) The local controller on the OC-N A interface detects the facility failure clear. The local controller in OC-N A reports the working line facility status to the local controller on OC-N B. The controller in OC-N B inputs this parameter into the facility APS algorithm operating on OC-N B and decides whether or not to initiate a change in the module selection request (the facility switch will not be initiated if the APS algorithm is a non-revertive algorithm). Note that OC-N A does not autonomously send K1* with a switch to STS-1 A state. In this state both STS-1 selection mechanisms implement the term of the selection state table shown in FIG. 9 and select STS-1** B (the protection line).

Figure 10:
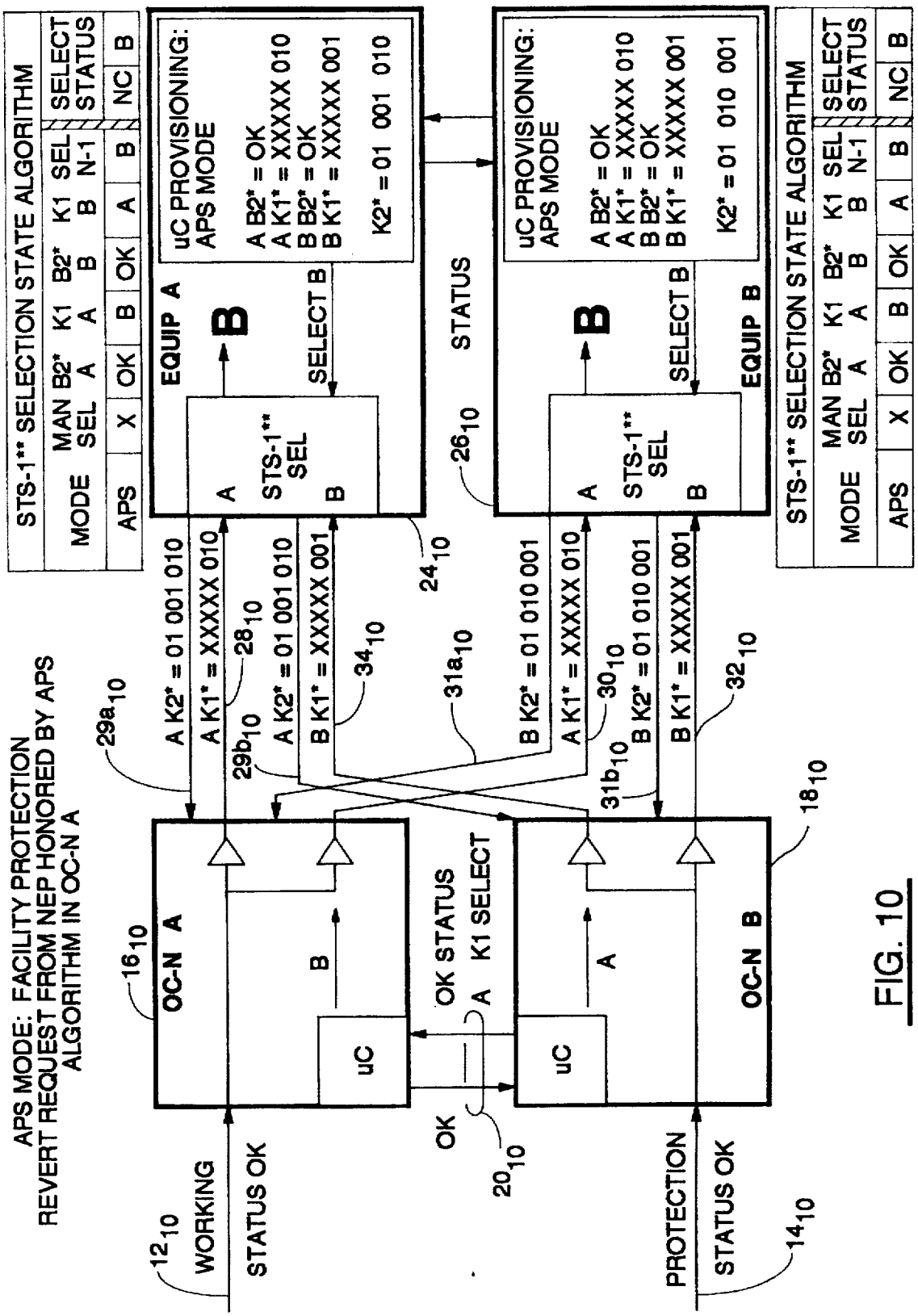

6. Revert Request Honored and Executed by the Facility APS Algorithm or Protection Line Failure 110: (FIGS. 4 & 10) When a revert to working line command is received by the facility APS algorithm on OC-N B, the controller on OC-N B provisions the K1* byte on both its STS-1 transmitters to indicate a request to switch to STS-1 A. It also sends a command to the OC-N A interface controller to request a switch to STS-1 A. In this state both STS-1 selection mechanisms implement the term of the selection state table shown in FIG. 10, recognize conflicting selection requests and remain in their initial state (a no change action), this leaves the payload still operating off of STS-1** B (the protection line).

Failures of the protection line also initiate the response described in this section with the exception that the APS algorithm initiates the switch from the protection line failure instead of waiting for a command to revert.

Figure 11:
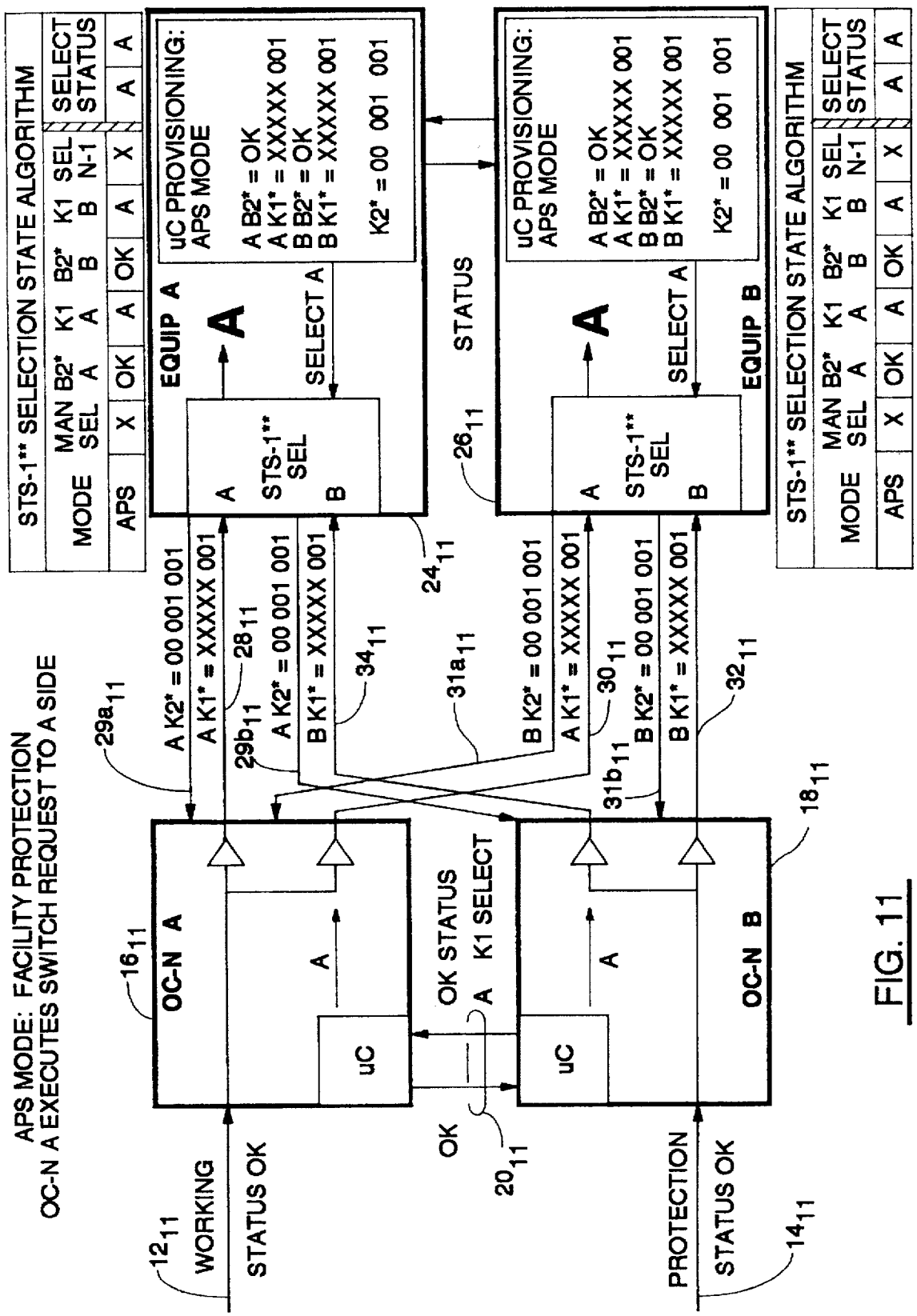

7. OC-N A Executes the Switch Request from OC-N B 112: (FIGS. 4 & 11) The controller on OC-N A receives the command to send a request to switch to STS-1** A (the working line). The controller provisions the K1* byte on both its STS-1 transmitters to indicate a request to switch to STS-1 A. In this state both STS-1 selection mechanisms implement the term of the selection state table shown in FIG. 11 and select STS-1 A (the working line). This is the initial state of the facility interface.

D.4.4. APS Mode, Equipment Selection Scenarios

The following sections provide examples of the three primary equipment failure scenarios. The first example demonstrates the reaction to the failure of an equipment payload path, the second example demonstrates the reaction to a failed local controller and the third example demonstrates the reaction to an unprovisioned module extraction.

The equipment selection scenarios are designed to demonstrate how the STS-1 selection mechanism implements the function of the STS-1 A (A or primary equipment) or STS-1B (B or backup equipment) selection. The equipment APS selection class of STS-1 selection mechanisms is used to implement the equipment protection selection for any equipment which has duplex equipment protection (usually referred to as duplex or redundant equipment protection).

The equipment APS algorithm is a symmetrical protection algorithm, equipment failures on the working equipment are handled the same way as equipment failures on the protection line. Since the failure of either equipment set when payload is being carried on the duplex equipment set requires no action by the STS-1 selection mechanism there is no explicit STS-1 selection scenario for this event. Actions initiated by the failure of the unused equipment set under these conditions are primarily alarm related, therefore refer to the equipment diagnostic section of each equipment set description for responses to the failure of an unused set. The failure of the redundant equipment set when the working equipment set has failed, a switch to the redundant set has been completed, the working equipment failure has cleared and is waited for manual restoration is a variation of the working equipment set failure scenario and is covered as a subset of this scenario.

APS Mode, Payload Path Equipment Failure

1. Initial State 114: (FIGS. 12 & 13) The controller instructs the local controllers for the corresponding duplex equipment interfaces and the STS-1 selection mechanism to operate in the APS mode. Both primary and backup equipment sets are operational and are provisioned to operate in the equipment APS mode. In this state both STS-1 selection mechanisms implement the term of the selection state table shown in FIG. 13 and select STS-1** A (the primary equipment set). Note that payload received from the primary equipment set is selected by both selecting equipment A and B duplex equipment sets.

2. Primary Equipment Fails 116: (FIGS. 12 & 14) The local controller on the primary equipment set detects an equipment failure. The controller on the primary equipment set A provisions the K1* byte on both its STS-1 transmitters to indicate a "no preference" switch request. The local controller in the primary equipment set A then reports the equipment failure condition to the local controller in the backup equipment set B. The controller in the backup equipment set B inputs this parameter into the equipment APS algorithm operating on the backup equipment set B and decides whether or not to initiate a change in the module selection request. In this state the STS-1 selection mechanisms implement the term of the selection state table shown in FIG. 14 and select STS-1** A (the primary equipment set).

3. Equipment APS Algorithm commands an APS to the Backup Equipment set 120: (FIGS. 12 & 15) The controller on the backup equipment set B provisions the K1* byte on both its STS-1 transmitters to indicate a request to switch to STS-1 B. In this state both STS-1 selection mechanisms implement the term of the selection state table shown in FIG. 15 and select STS-1 B (the backup equipment set). This is the long term state of the equipment with a primary equipment set failure until operation of the primary equipment set is restored.

Figure 16:
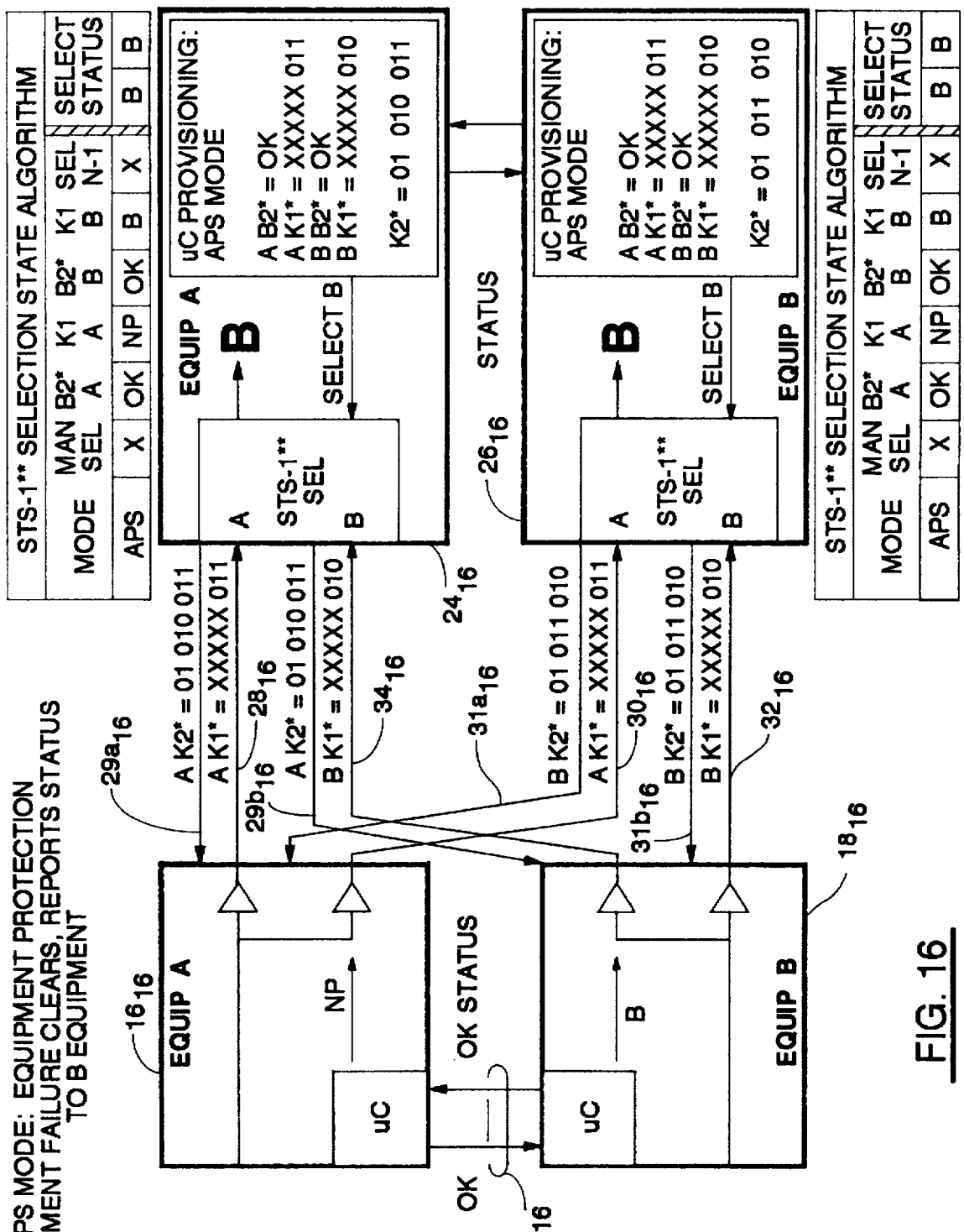

4. Equipment Failure Clears 122: (FIGS. 12 & 16) The local controller on the primary equipment set A detects the equipment failure clear. The local controller in the primary equipment set A reports the primary equipment set status to the local controller in the backup equipment set B. The controller in the backup equipment set B inputs this parameter into the equipment APS algorithm operating on the backup equipment set B and decides whether or not to initiate a change in the module selection request (the equipment switch will not be initiated if the APS algorithm is a non-revertive algorithm). Note that the primary equipment set A does not autonomously send K1* with a request to switch to STS-1 A state. In this state both STS-1 selection mechanisms implement the term of the selection state table shown in FIG. 16 and select STS-1** B (the primary equipment set).

Figure 17:
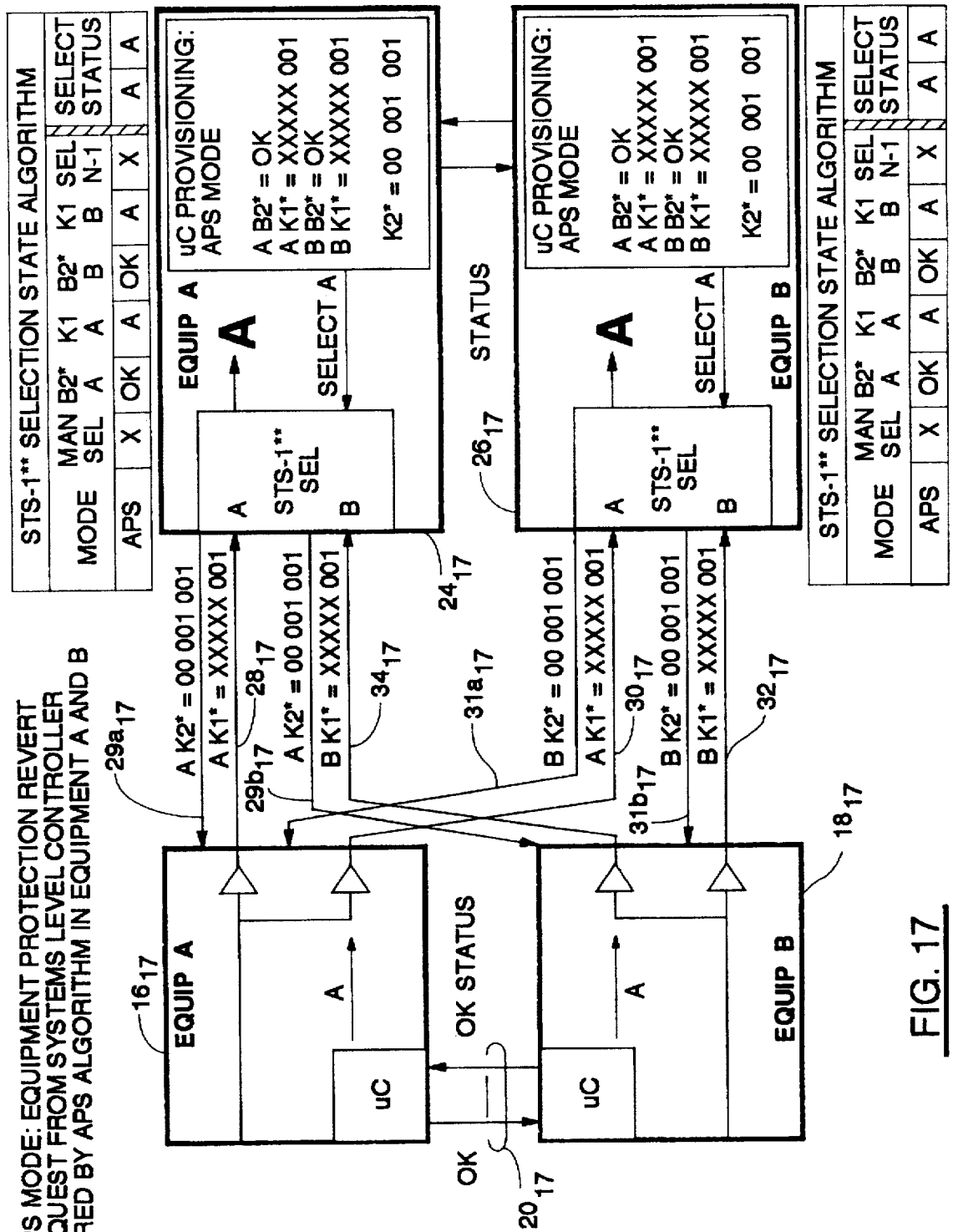

5. Revert Request Honored and Executed by the Equipment APS Algorithm or Backup Equipment set Failure 124: (FIGS. 12 & 17) When a command to revert to the A (working side) equipment set is received by both local controllers, the controllers on both equipment sets provision the K1* bytes on their respective STS-1 transmitters to indicate a request to switch to STS-1 A. In this state both STS-1 selection mechanisms implement the term of the selection state table shown in FIG. 17 and select STS-1 A (the primary equipment set). This is the initial state of the equipment interface.

Failures of the backup equipment set also initiate a switch back to the primary equipment set A. The response to this failure operates as described in operation descriptions 2 and 3 above with the exception that the labels A and B are reversed.

D.4.5 APS Mode, Local Controller Failure

The local controller scenario is similar to the payload path failure scenario with the exception that with a local controller failure the processor can no longer insert the "no preference" state in the transmitted K1* byte and program the "Not OK" equipment status toward the duplex controller. This failure is handled by having the hardware output of the watchdog timer which is active when the local controller fails, force the transmitted K1* byte and duplex equipment status line to their K1*=all 1's (no preference) and "Not OK" respective states.

The equipment status signal and the ability to force K1* to the "no preference" state shall be implemented in a manner which does not require the microprocessor or its serial link to be operational and requires a little hardware as possible to be operational. These states shall be capable of being set active by the local controller or forced active by the watchdog timer or similar mechanism.

Figure 12:
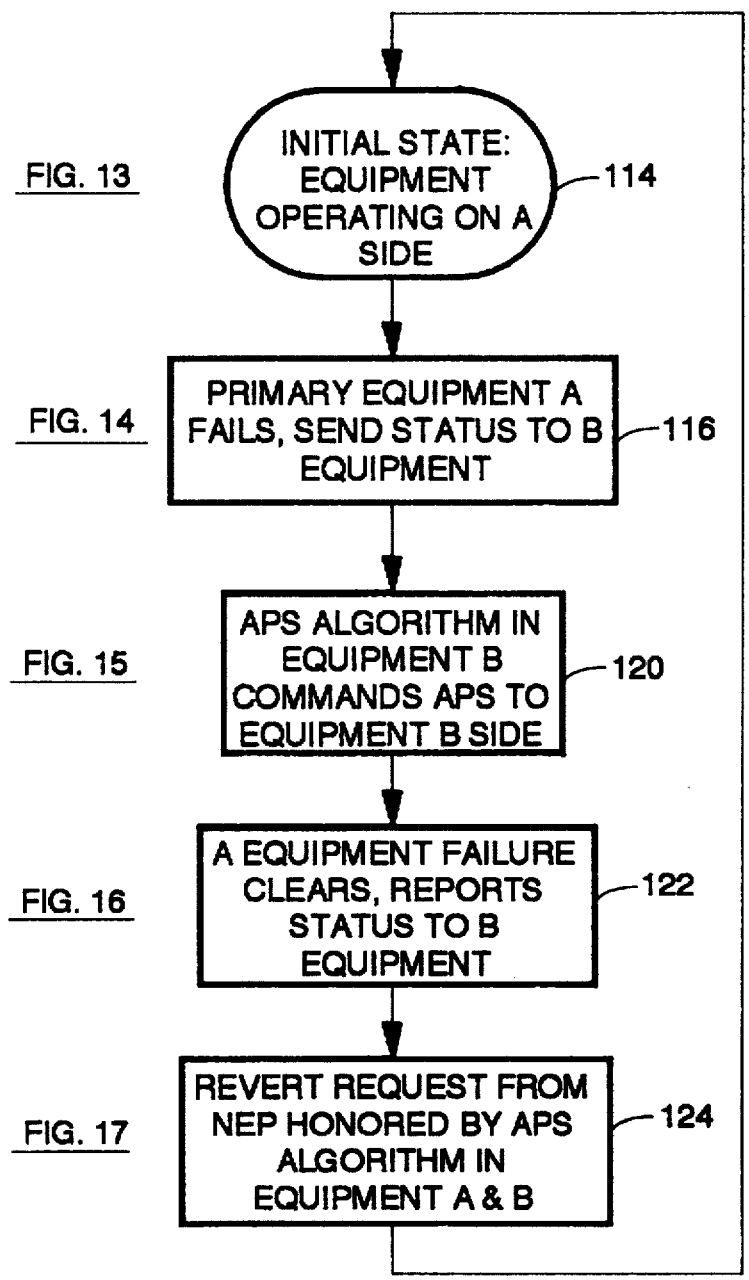
FIG. 12 shows an equipment selection scenario carried out, according to the present invention, according to a APS mode equipment protection algorithm, as further detailed in FIGS. 13–17.
Figure 13:
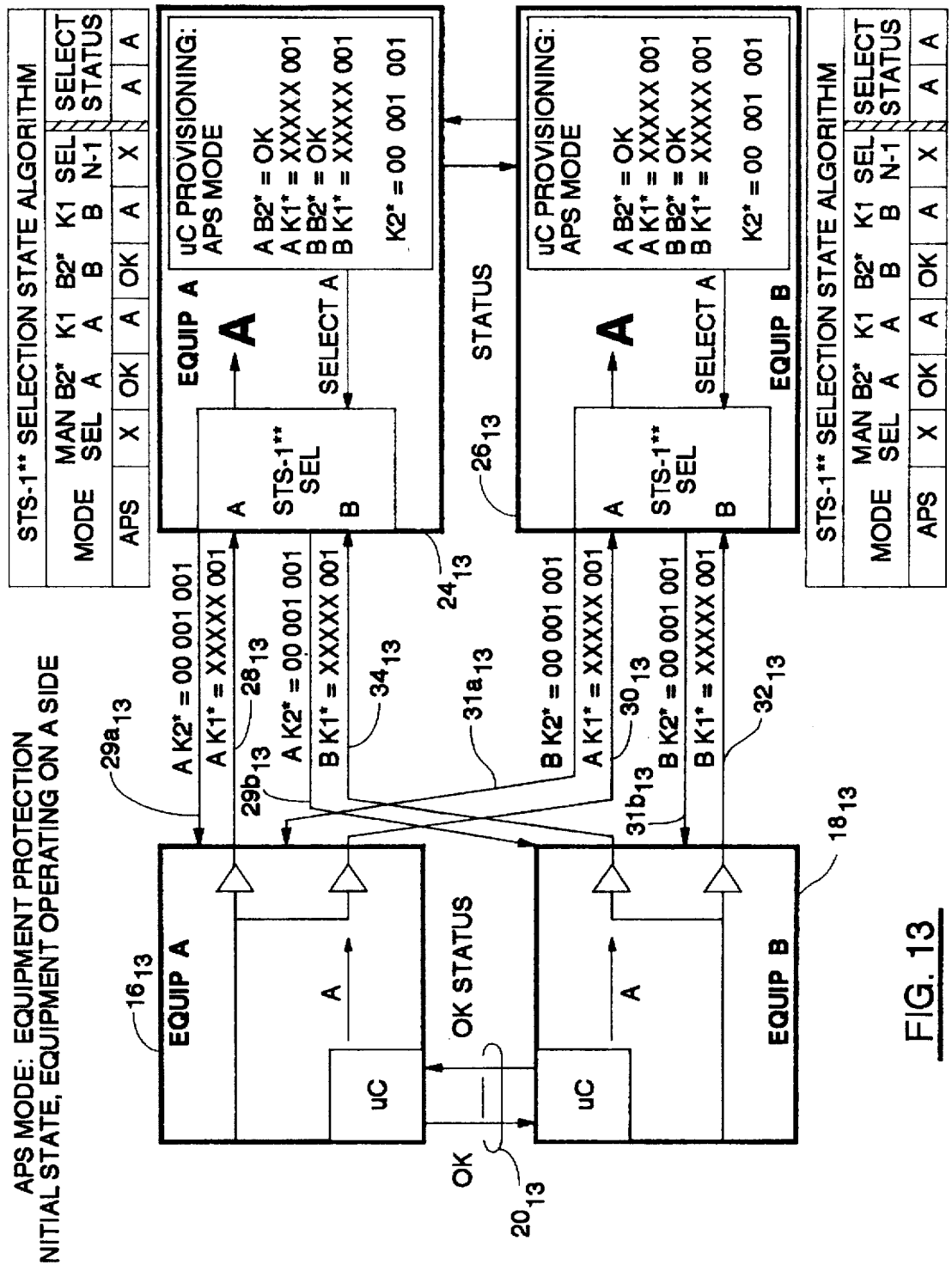
Figure 14:
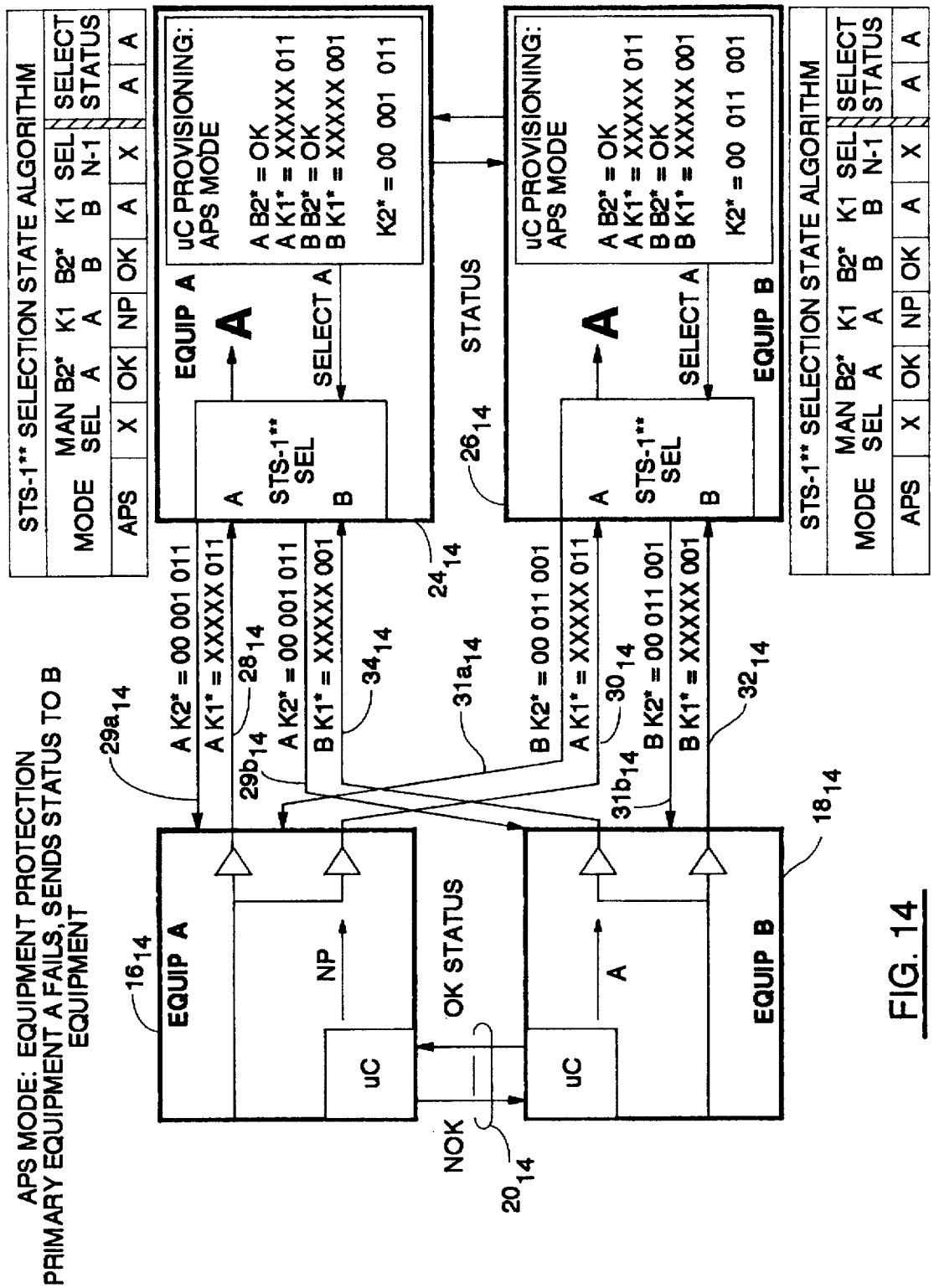
Figure 15:
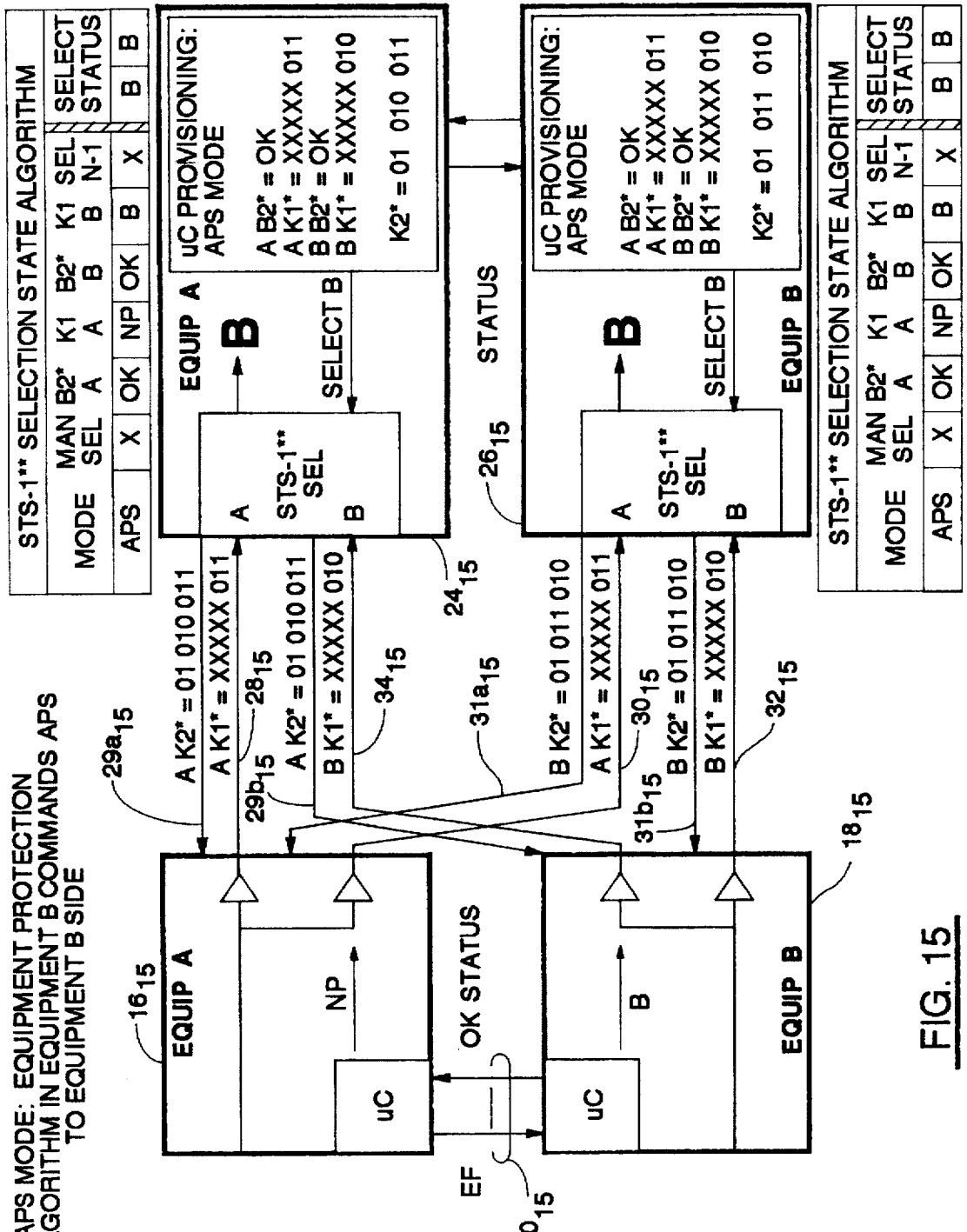
Figure 18:
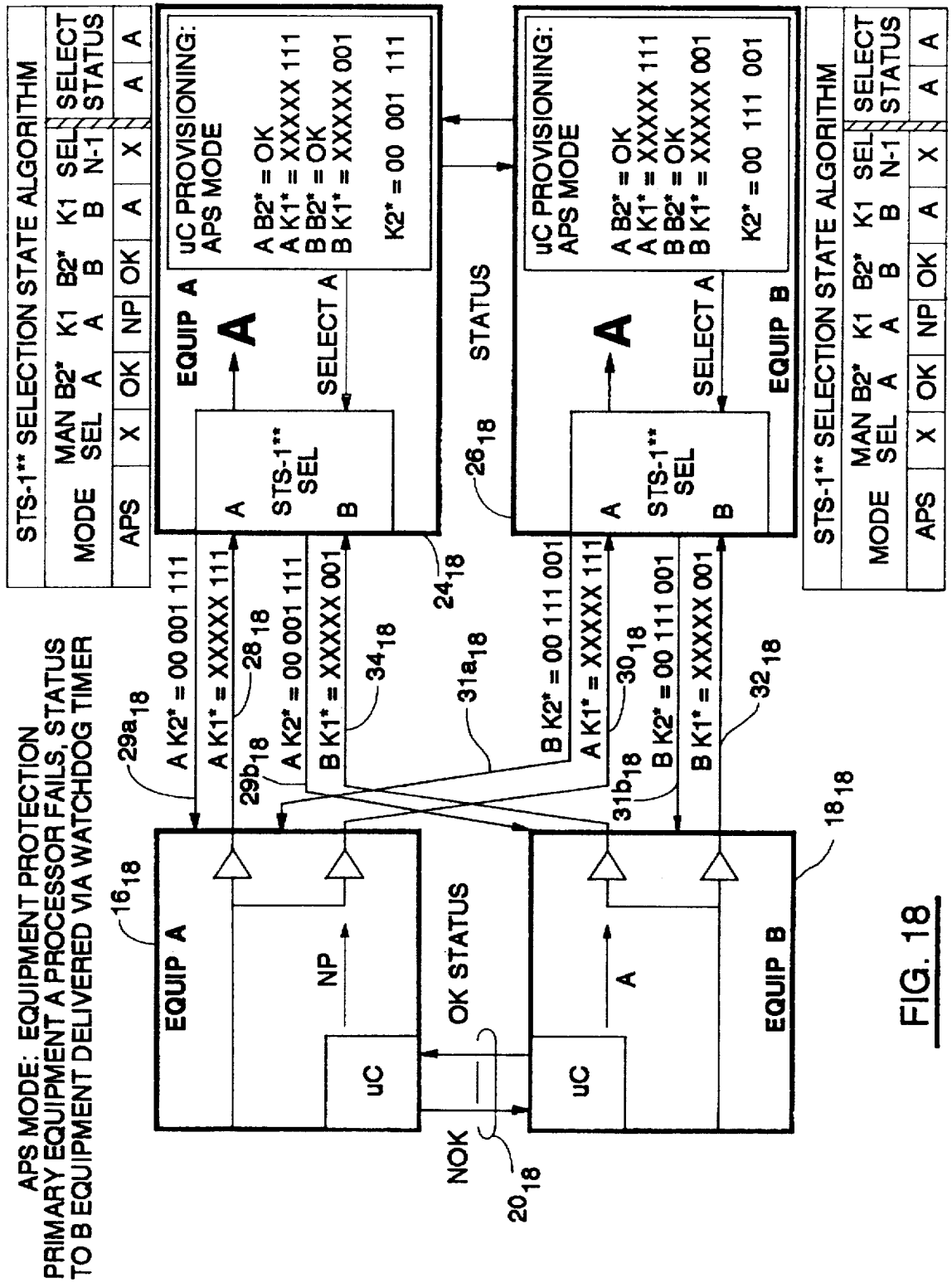
FIGS. 18 and 19 show a local controller failure scenario which may be best understood by substituting FIGS. 18 and 19 for FIGS. 14 and 15 in FIG. 12.
Figure 19:
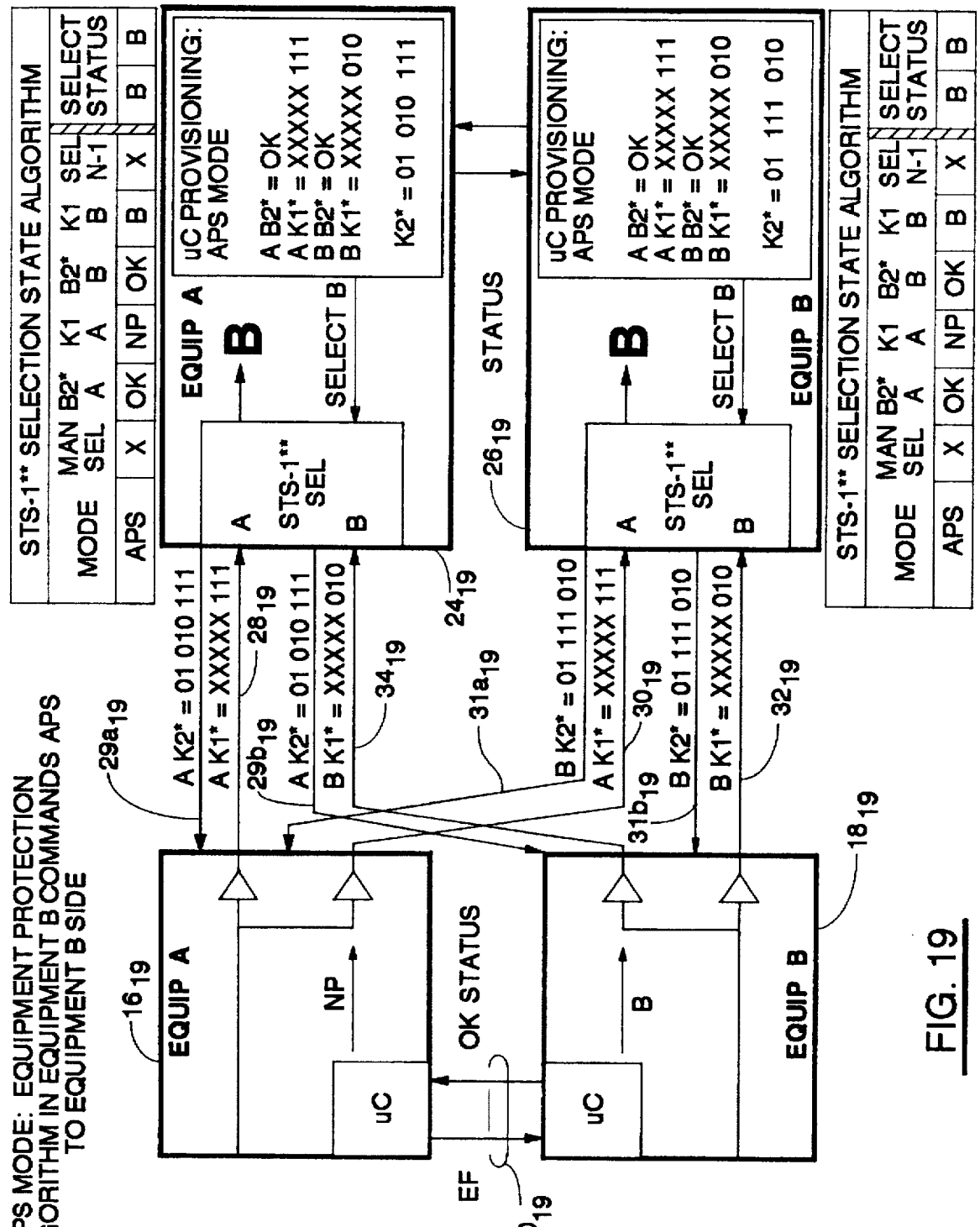

The complete scenario of this type of failure event is described by substituting FIG. 18 and FIG. 19 for FIGS. 14 and 15, respectively in the sequence of steps of FIG. 12. The descriptions of these events change only in that equipment A sends an all 1's signal (interpreted as a no preference request) in the K1* byte when the processor fails instead of the 011 no preference selection request.

D.4.6 APS Mode, Unprovisioned Module Removal

The unprovisioned module removal scenario is similar to the payload path failure scenario with the exception that with a local controller failure the processor can no longer insert the "no preference" state in the transmitted K1* byte and program the "Not OK" equipment status toward to duplex controller. This failure is handled by having a mechanism such as pull-up resistors on the modules receiving these signals which automatically force the state of the receiving modules input lines to their K1*=all 1's (no preference) and "Not OK" respective states when the duplex module is removed.

All data and status lines for STS-1 interfacing modules shall have mechanisms and signal sense definitions such that any STS-1 module removal will result in an insertion all 1's (AIS) in the payload path and a "Not OK" for all status lines.

Figure 20:
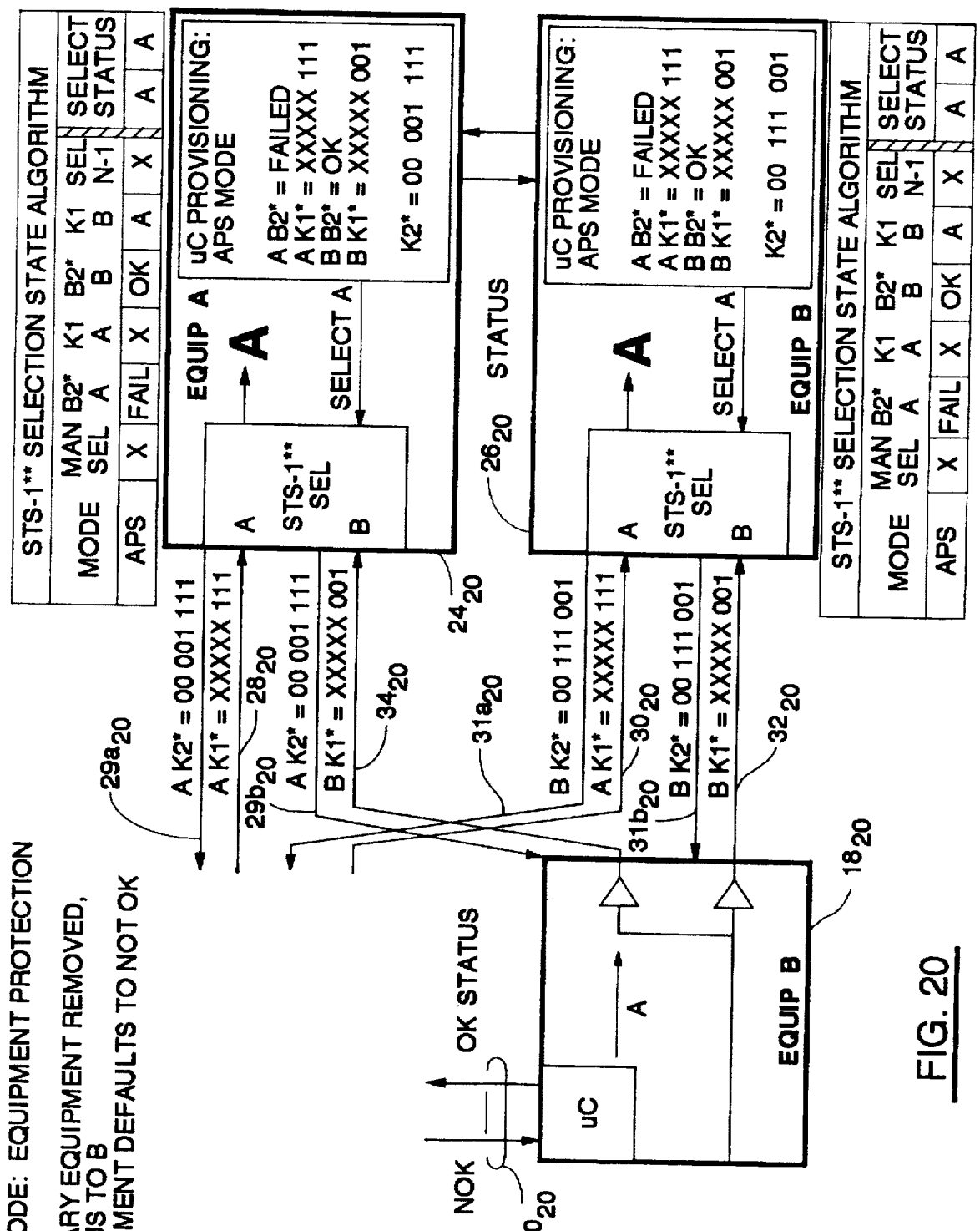
FIGS. 20 and 21 show an unprovisioned module removal scenario similar to the payload path failure scenario and which may also best be understood by substituting FIGS. 20 and 21 for FIGS. 14 and 15 in FIG. 12.
Figure 21:
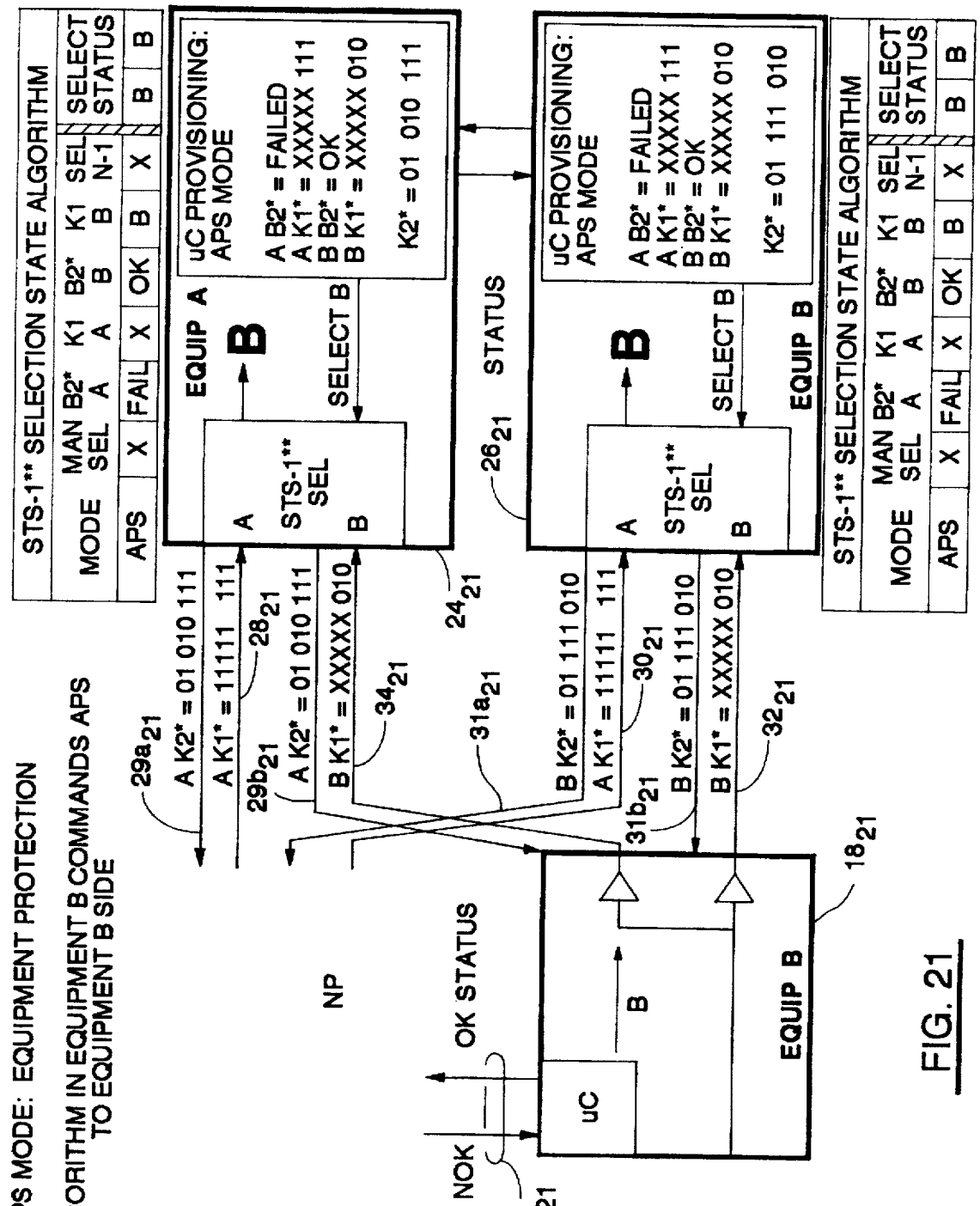

The complete scenario of this type of failure event is described by substituting FIGS. 20 & 21 for FIGS. 14 & 15, respectively. The descriptions of these events change only in that the equipment receiving the STS-1** A receives an all 1's signal (interpreted as a no preference request) in the K1* byte when the processor fails instead of the 011 no preference selection request.

Figure 22:
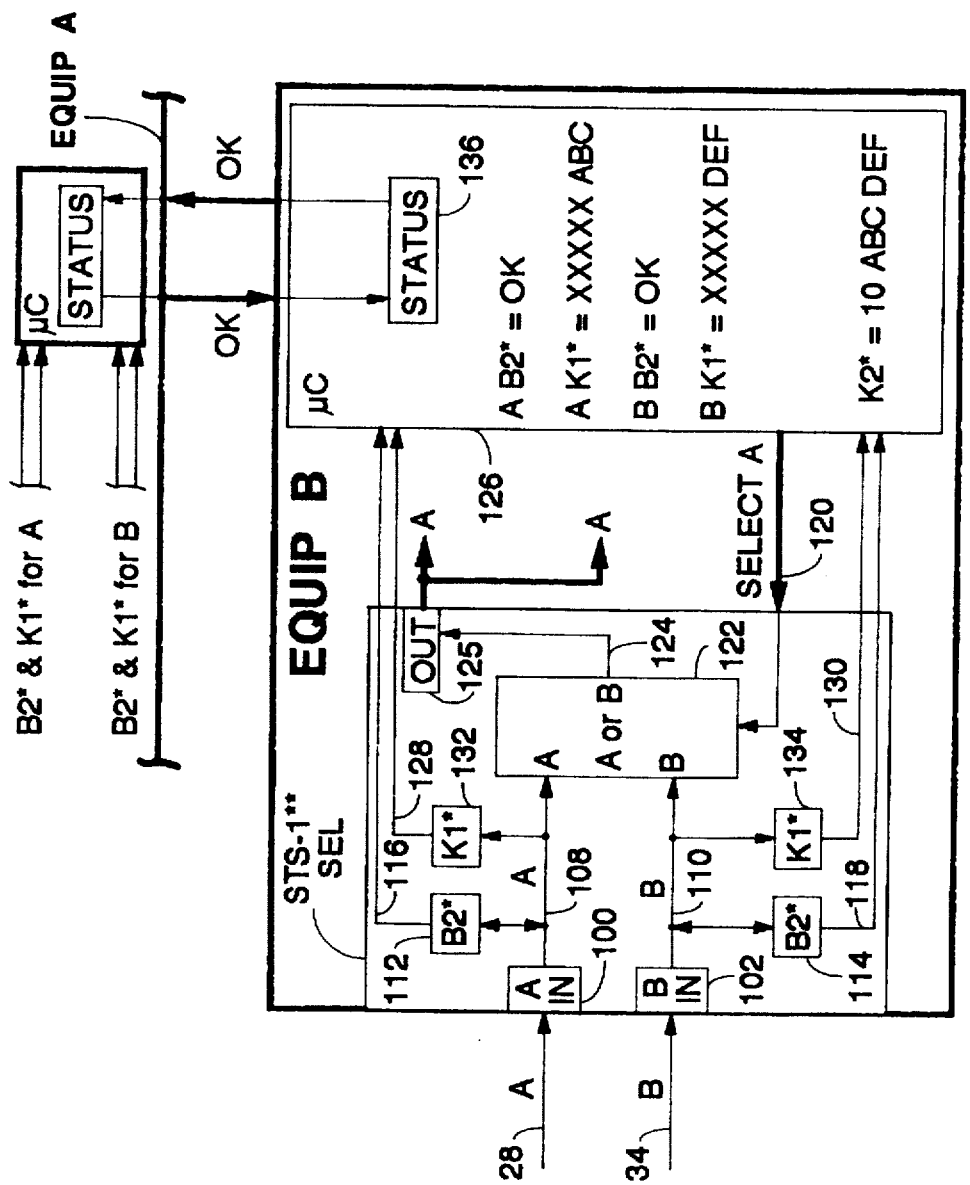
FIG. 22 shows a common subsystem such as used in any of the interfaces of FIGS. 1–3, 5–11, or 13–21, which shows particular example with in a B equipment such as from FIG. 2.

FIG. 22 shows a common subsystem such as used in any of the interfaces of FIGS. 1–3, 5—11 or 13–21, which shows a particular example within a B equipment such as from FIG. 2. Within the STS-1 SEL may be found an A input means 100 and a B input means 102 responsive, respectively, to incoming A and B signal lines 28, 34. The input means 100, 102 provide the A and B input lines 28, 34 on lines 108, 110 internal to the STS-1 SEL. Means 112, 114 are provided for checking for errors on the A and B lines 108, 110 and for providing a failure or measure of "goodness" signal 116, 118 in the event of a measurement indicating that path A or B "goodness" is deteriorating or has deteriorated to a failure condition. As mentioned above, this may be keeping a count of odd parity errors, for example. The measure of path A or B goodness is provided, for example, on the lines 116, 118 to a microcontroller which further evaluates path goodness for providing a selection signal on a line 120 to a selector 122 which is responsive to both the A and B signals on the lines 108, 110 for selecting one or the other at an output signal line 124 thereof. An output 125 of the subsystem provides the selected output to both downstream units as indicated. The microcontroller 126 is also responsive to A and B K1* signals on lines 128, 130 being indicative of the K1* value for the respective paths A and B. If the upstream unit sending the data on the lines 28, 34 is indicating a K1* value that requires a particular channel to be switched downstream, the microcontroller 126 will provide the appropriate selection signal on the line 120. Means 132, 134 are provided for detecting K1* overhead signals interspersed with working path data for signal path switching information inserted by the upstream subsystem. FIG. 22 also shows a status block 136 which receives a status signal from substantially identical equipment and provides a similar signal thereto.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Apparatus having automatic protection switching, comprising:

a working transmit interface (16), responsive to a selection command signal (20b) and to an input working signal (12), for providing a working status signal (20a) and a pair of identical output working signals including a first output working signal (28) and a second output working signal (30) having data and selection information;

a protection transmit interface (18), responsive to the working status signal (20a) and to an input protection signal (14), for providing the command signal (20b) and a pair of identical output protection signals including a first output protection signal (34) and a second output protection signal (32) having data and selection information;

working receive interface (24), responsive to the first output working signal (128) and to the first output protection signal (34) for selecting one of the first output working and protection signals (28, 34) according to the selection information therein; and a protection receive interface (26), responsive to the second output working signal (30) and to the second output protection signal (32) for selecting one of the second output working and protection signals (30, 32) according to the selection information therein.

2. The apparatus of claim 1, wherein the working receive interface (24) is responsive to the selected first output working or protection signal (28 or 34) for providing a confirmation signal (29a) to the working transmit interface (16) and for providing a confirmation signal (29b) to the protection transmit interface (18) and wherein the protection receive interface (26) is responsive to the selected second output working or protection signal (30 or 32) for providing a confirmation signal (31a) to the working transmit interface (16) and for providing a confirmation signal (31b) to the protection transmit interface (18).

3. The apparatus of claim 1, wherein the working and protection transmit interfaces (16, 18) are SONET interfaces and wherein the working and protection receive interfaces (24, 26) are cross-connects and wherein the working cross-connect (24) provides a working status signal (25a) in response to the selected one of the first output working and protection signals (28, 34) and is also responsive to a command signal (25b) for providing a pair of identical working drop signals including a first working drop signal (40) and a second working drop signal (44) having data and selection information and wherein the protection cross-connect (26) provides the command signal (25b) in response to the working status signal (25a) and also provides an identical pair of protection drop signals including a first protection drop signal (42) and a second protection drop signal (46) having data and selection information.

4. The apparatus of claim 3, further comprising:

a working drop module (36), responsive to the first working drop signal (40) and to the first protection drop signal (42), for providing a working output signal (48); and a protection drop module (38), responsive to the second working drop signal (44) (44) and to the second protection drop signal (46), for providing a protection output signal (50).

5. Apparatus having automatic protection switching, comprising:

a working high speed interface (16), responsive to a command signal (20b) and to a synchronous optical network (SONET) serial working signal (12), for providing a status signal (20a) and a pair of identical parallel working signals including a first output working signal (28) and a second output working signal (30) having data and selection information;

a protection high speed interface (18), responsive to the status signal (20a) from the interface (16) and to a SONET serial protection signal (14), for providing the command signal (20b) and a pair of identical parallel protection signals including a first output protection signal (34) and a second output protection signal (32) having data and selection information;

a working cross-connect (24), responsive according to said selection information to the first output working and protection signals (28,34), for providing a pair of identical working drop signals including a first working drop signal (40) and a second working drop signal (44) having data and selection information;

a protection cross-connect (26), responsive according to said selection information to the second output working and protection signals (30, 32), for providing a pair of identical protection drop signals including a first protection drop signal (42) and a second protection drop signal (46);

a working drop module (35), responsive to the first working and protection drop signals (40, 42), for providing a protection output signal (50).

6. Apparatus having equipment protection switching, comprising:

a working transmit interface (16), responsive to a protection status signal (20b) and to an input working signal (12), for providing a working status signal (20a) and a pair of identical transmit working signals including a first output working signal (28) and a second output working signal (30) having data and selection information provided according to a selection algorithm;

a protection transmit interface (18), responsive to the working status signal (20a) and to an input protection signal (14), for providing the protection status signal (20b) and a pair of identical transmit protection signals including a first output protection signal (34) and a second output protection signal (32) having data and selection information provided according to the same selection algorithm as in the working transmit interface (16);

a working receive interface (24), responsive to the first output working signal (28) and to the first output protection signal (34), for selecting one of the first output working or protection signals (28, 34) according to the selection information therein; and a protection receive interface (26), responsive to the second output working signal (30) and to the second output protection signal (32) for selecting one of the second output working or protection signals (30, 32).

7. An automatic protection method for a synchronous optical network (SONET) element having redundant A and B sides each side having a high speed interface responsive to a redundant working line on the A side and a redundant protection line on the B side for providing payload signals from the working line or the protection line to subsequent units on the A and B sides, comprising the steps of:

providing payload signals from the redundant working line on the A side and payload signals from the the redundant protection line on the B side to subsequent units on both the A and B side;

determining (102) on the A side that a facility failure of the working line exists and reporting a failed status to the B side;

commanding (104) from the B side to the A side to switchover to a state with payload signals provided from the redundant protection line on the B side; and executing (106) a switchover on both the A and B side subsequent units for responding to payload signals from the redundant protection line on the B side.

8. The method of claim 7, further comprising the steps of:

determining (108, 110) that the facility failure of the working line has cleared; and executing (112) a switchover on both the A and B subsequent units for responding to payload signals from the redundant working line on the A side.

9. An equipment protection method for a synchronous optical network (SONET) element having redundant A and B equipment sides, each side having a high-speed interface equipment responsive to a working line on the A equipment side and a protection line on the B equipment side, and having a normal facility state (114) with payload signals provided from the working line from the high-speed interface equipment to a first stage of subsequent equipment, comprising the steps of:

providing redundant working payload signals from each equipment on the A equipment side for a next successive stage of both A and B side subsequent equipment and redundant protection payload signals from each equipment on the B side for the next successive stage of both A and B side subsequent equipment;

using the working payload signals provided from a same side working line in each equipment on both the A and B sides for the normal facility state;

determining (116) on the A or B equipment side that an equipment failure of the A or B equipment side exists and reporting a failed equipment status from the failed A or B side equipment to a comparable non-failed redundant equipment on the B or A side, respectively;

commanding (120) in the non-failed side comparable equipment a switchover to the non-failed side comparable equipment; and using the working payload signals provided from the comparable non-failed redundant equipment on the B or A side, respectively, in a next successive subsequent A or B side equipment, respectively.

10. The method of claim 9, further comprising the steps of:

determining (122) on the failed side that the failed side equipment failed status has cleared and reporting same to the non-failed side; and returning (124) to using the working payload signals provided from the same side working line in the equipment in which the failed status has cleared.

11. A method of switching to facility data and overhead signals from a standby B path upon detection of main A path signal failure, comprising the steps of:

checking incoming A path signals by an A path working channel interface unit;

directly notifying a B channel standby interface unit, which is simultaneously receiving data identical to the data on said A path, that a signal failure condition exists on the A path;

providing a switchover command signal from the B channel standby interface unit to the A path working channel interface unit; and inserting a coded signal provided to a subsequent unit, as part of the overhead signals, by both the A and B channel interface units indicating that B channel data should be responded to rather than A channel data until otherwise notified.

12. The method of claim 11, wherein the method further comprises steps for switching equipment in the A and B paths, wherein said further steps comprise:

checking, in pairs of identical A path and B path equipment, by means of identical failure detecting algorithms resident in each equipment of a given pair;

detecting a failure in a first redundant equipment of a pair and directly notifying a second redundant equipment of said pair, which is simultaneously receiving data on an identical channel wherein said received data is identical to received data on said first redundant equipment, that switching to the second redundant equipment should occur; and inserting said coded signal provided, as part of the overhead signals, by both the first and second redundant equipment to said subsequent unit to inform said subsequent unit that it should respond to data from said second redundant equipment rather than from said first redundant equipment until otherwise notified.

13. A method of equipment protection switching between substantially identical sets of serially connected modules normally comprising independent working and protection communication paths, comprising the steps of:

checking, using an identical algorithm resident in identical redundant working and protection modules of equipment pairs connected in stages of said pairs in said paths, the working module for normally transporting working data signals and overhead data signals, and the protection module for normally transporting identical protection data signals and overhead data signals, said overhead data signals having signals pertaining to identifying a selected one of said identical redundant working and protection modules;

communicating self-status signal directly between said identical redundant working and protection modules, and wherein said identical algorithms operate to determine at least one of, a presently designated working module that is not outputting correct data signals, a presently designated working module that is not receiving correct data signals, and a presently designated working module that has received overhead data indicating that a switch of working data signals is about to occur; and communicating with a next equipment pair, via said overhead data signals, to respond to data signals from said protection module.

14. A method of protecting data provided in signal paths by a series of redundant sets of interconnected A and B path subsystems each normally receiving identical working data from an immediately preceding subsystem and wherein normally only A subsystems are providing active data, comprising the steps of:

supplying data from each subsystem to both an A and B path subsequent subsystem;

checking for errors in the identical working data received by each A and B path subsystem from a preceding subsystem;

detecting overhead data interspersed with working path data for signal path switching information inserted by a preceding subsystem; and switching inputs of only a preceding protection path subsystem to a subsequent working path subsystem when said checking determines switching should occur on account of errors.

15. A common subsystem, acting in conjunction with function specific circuitry, for use in a series path of interconnected signal processing subsystems incorporated in a working data path or protection path, comprising, in combination:

first and second input means (100, 102) for receiving incoming A and B data path signals (28, 34) from A and B data paths for providing received A and B path signals (108, 110);

means (112, 114), responsive to the received A and B path signals (108, 110) for checking for errors in the incoming A and B data path signals (28, 34) received by the first and second input means for providing a failure signal (116, 118) in the event of a detection thereof;

A and B output means (122), responsive to the received A and B path signals (108, 110) for providing identical A or B path data signals (124, 125), including overhead indicative of said failure signal, to subsequent A and B path subsystems;

means (132, 134) for detecting overhead signals interspersed with working path data signals in the incoming A and B data path signals (28, 34) for signal path switching information inserted by a preceding subsystem for providing a path select signal (128, 130); and status means (126) responsive to said path select signal and said failure signal for providing a switch signal (120), wherein said A and B output means (122) is responsive to said switch signal for switching between data signals supplied at said first and second input means (100, 102) when said path select or failure signals indicate a switch should be made.

16. Apparatus as claimed in claim 15, wherein said status means (126) is responsive to a first status signal from a substantially identical subsystem for providing said switch signal (120) and responsive to said path select and failure signals for providing a second status signal to said substantially identical subsystem.

17. Apparatus for switching from using payload and overhead data signals from a main A path to a standby B path upon detecting main A path failure, comprising:

selection means in both the main A path and standby B path for checking both incoming A and B path signals for providing respective A and B error detection signals and respective A and B overhead switchover signals;

controller means in both the main A path and the standby B path, responsive to the respective A and B error detection and overhead switchover signals, for interchanging respective status signals to which they are respectively responsive, for providing respective selection signals; and wherein said selection means in both the main A path and the standby B path are responsive to said respective selection signals, for providing said payload and overhead data signals from the main A path or standby B path and for inserting a coded signal sent downstream, as part of the overhead data signal, to downstream identical apparatus to inform said downstream identical apparatus to use payload and overhead data signals from a selected main A path or standby B path.

18. The apparatus of claim 17, wherein said selection means in the A and B paths further comprises:

means for checking said incoming A and B path signals by means of identical failure detecting algorithms resident in each selection means.

19. Apparatus for switching between redundant modules that are serially connected in independent working and protection communication paths, comprising:

means for checking, using an identical failure checking algorithm resident in each of the redundant modules, each module responsive to working and protection data and overhead signals, one module for providing detection signals and for transporting working data and overhead signals, and the other module for providing detection signals and for transporting identical protection data and overhead signals, said overhead signals identifying a selected one of said redundant modules to be used as a working or protection module;

means, responsive in each module to respective detection signals, for communicating self-status signals directly between said redundant modules and wherein one of said redundant modules is presently designated as working, and wherein said identical failure checking algorithms operate to determine at least one of, a presently designated working module is not outputting correct data, the presently designated working module is not receiving correct data, and the presently designated working module has received overhead signals indicating that a switch of working data signals is about to occur; and wherein said means for checking said overhead signals with signal information to respond to data from said working or protection module.

20. Apparatus for transporting data through a series of substantially identical sets of interconnected A and B path upstream to downstream subsystems each normally receiving identical A and B path data signals and wherein normally only A subsystems are serially interconnected as upstream to downstream subsystems to a customer, comprising:

- means resident in each A and B path upstream to downstream subsystem, responsive to A and B path data signals from identical A and B upstream subsystems, for providing selected A or B path data signals to both an A and a B path downstream subsystem;
- means resident in each A and B path upstream to downstream subsystem, responsive to the A and B path data signals from the identical A and B upstream subsystems, for checking for errors therein for providing an error signal;
- means resident in each A and B path upstream to downstream subsystem, responsive to the A and B path data signals from the identical A and B path upstream subsystems, for detecting overhead data signals for signal path switching information inserted by the identical A and B upstream subsystems for providing a selection signal; and
- means resident in each A and B path upstream to downstream subsystem, responsive to the A and B path data signals from the identical A and B upstream subsystems, and responsive to both the error signal and the selection signal for transporting selected A or B path data signals to A and B path downstream subsystems.

* * * * *

UNITED STATES PATENT AND TRADEMARK OFFICE
CERTIFICATE OF CORRECTION

PATENT NO.  : 5,740,157
DATED       : April 14, 1998
INVENTOR(S) : Demiray et al It is certified that error appears in the above-identified patent and that said Letters Patent is hereby corrected as shown below:

At column 17, line 50, (claim 1, line 18), please cancel "(128)" and substitute --(28)-- therefor.
    line 49, insert "a" before working,
At column 18, line 24 (claim 4, line 7), please cancel "(44)" at its second occurrence;

at line 56 (claim 5, line 29), please cancel "(35)" and substitute --(36)-- therefor; and at line 58 (claim 5, line 31), prior to "protection", please insert --working output signal (48); and
    a protection drop module (38), responsive to the second working and protection drop signals (44, 46), for providing a--.

Signed and Sealed this

Fifteenth Day of December, 1998

Attest:

BRUCE LEHMAN

*Attesting Officer*     *Commissioner of Patents and Trademarks*